(12) United States Patent
Uyama et al.

(10) Patent No.: US 8,341,102 B2
(45) Date of Patent: Dec. 25, 2012

(54) USER STATE PRESUMPTION SYSTEM, USER STATE PRESUMPTION METHOD, AND RECORDING MEDIA STORING USER STATE PRESUMPTION PROGRAM

(75) Inventors: Masashi Uyama, Kawasaki (JP); Mitsuru Oda, Kawasaki (JP); Yasuhide Matsumoto, Kawasaki (JP); Satoru Watanabe, Kawasaki (JP); Masatomo Yasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 704 days.

(21) Appl. No.: 12/190,150

(22) Filed: Aug. 12, 2008

(65) Prior Publication Data

US 2009/0076995 A1    Mar. 19, 2009

(30) Foreign Application Priority Data

Aug. 13, 2007    (JP) .................................. 2007-210927

(51) Int. Cl.
*G06F 17/00* (2006.01)
*G06G 7/48* (2006.01)

(52) U.S. Cl. ............................................. 706/46; 703/6
(58) Field of Classification Search ................ 705/14.45
See application file for complete search history.

(56) References Cited

U.S. PATENT DOCUMENTS 6,154,767 A * 11/2000 Altschuler et al. ............ 709/203
6,839,680 B1 * 1/2005 Liu et al. ...................... 705/7.33
7,610,289 B2 * 10/2009 Muret et al. ........................ 1/1
2003/0171977 A1 * 9/2003 Singh et al. ..................... 705/10
2009/0164395 A1 * 6/2009 Heck ............................... 706/16

FOREIGN PATENT DOCUMENTS

| JP | 2001-142907 | 5/2001 |
| JP | 2002-197257 | 7/2002 |
| JP | 2003-030403 | 1/2003 |
| JP | 2003-122982 | 4/2003 |

OTHER PUBLICATIONS

Fan Wu et. al, Prediction of the Intention of Purchase of the User Surfing on the Web Using Hidden Markov Model, IEEE, 2005, 387-389.*
Hidetaka Katahira, "Marketing Science", University of Tokyo Press, 1987 p. 24.
Digital Advertising Consortium Inc., i-Media Drive Inc. "Kodo Targetingu Kokiku (BTA) no Kokoku Koka wo Honkakuteki ni Kensho (Full Verification of Advertising Effextiveness in Behavioral Targeting Advertisement (BTA))", internet, <URL:http://www.dac.co.jp/dacfiles/200701%2OBTA_tyousa.pdf, Jan. 26, 1997.

(Continued)

*Primary Examiner* — David R Vincent
*Assistant Examiner* — Paulinho E Smith
(74) *Attorney, Agent, or Firm* — Staas & Halsey LLP

(57) ABSTRACT

A user state presumption system and method determines whether a user has exhibited a specific intended behavior that is an aim of service(s) provided by analyzing data of a series of accesses of the user made relative to the service(s). An intended behavior probability calculator is provided which calculates, every predetermined period, a proportion of users who have exhibited the intended behavior among the plurality of users and records the obtained proportion calculated to implement the user state presumption system and method.

7 Claims, 17 Drawing Sheets

OTHER PUBLICATIONS

Nikkei Business Publications, :the Internet URL:http://www.nikkeibp.co.jp/style/biz/net/keyperson/060809__dac/), Aug. 9, 2006.

Toyoda, Hideki. "Komoku Hanno Riron (Nyumon Hen) (Item Response Theory (Introduction)", Asakura Publishing, 2002, Preface. Apr. 10, 2002.

"IRT niyoru Joho Teikyo Gata Web Saito no Akusesu Bunseki (Web Access Analysis with IRT for an Information-Supplying Type of Website)" Hashima, Tomohiro, FIT 2006(The Fifth Forum on Information Technology), pp. 423-425, Sep. 5, 2006.

* cited by examiner

FIG. 2B

| PRE-BEHAVIOR CATEGORY GROUP | IN-SESSION BEHAVIOR PATTERN | POST-BEHAVIOR CATEGORY GROUP | EXPLANATION |
|---|---|---|---|
| NON-ACCESS GROUP | PATTERN 1 (CAREFUL BROWSING & NO CONTRACT) | PENDING GROUP | COMPREHENDED BUT PENDING |
| NON-ACCESS GROUP | PATTERN 2 (GLANCE & NO CONTRACT) | LESS-INTERESTED GROUP | ORIGINALLY UNINTERESTED |
| NON-ACCESS GROUP | PATTERN 3 (CONTRACT) | CONTRACT GROUP | CONTRACT |
| LESS-INTERESTED GROUP | PATTERN 1 (CAREFUL BROWSING & NO CONTRACT) | PENDING GROUP | COMPREHENDED BUT PENDING |
| LESS-INTERESTED GROUP | PATTERN 2 (GLANCE & NO CONTRACT) | LESS-INTERESTED GROUP | CONTINUED TO BE UNINTERESTED |
| LESS-INTERESTED GROUP | PATTERN 3 (CONTRACT) | CONTRACT GROUP | CONTRACT |
| PENDING GROUP | PATTERN 1 (CAREFUL BROWSING & NO CONTRACT) | PENDING GROUP | DECISION IS PENDING |
| PENDING GROUP | PATTERN 2 (GLANCE & NO CONTRACT) | HESITANT GROUP | AFTER COMPREHENSION, BECOME LESS INTERESTED |
| PENDING GROUP | PATTERN 3 (CONTRACT) | CONTRACT GROUP | CONTRACT |
| HESITANT GROUP | PATTERN 1 (CAREFUL BROWSING & NO CONTRACT) | PENDING GROUP | BECOME MORE INTERESTED AGAIN |
| HESITANT GROUP | PATTERN 2 (GLANCE & NO CONTRACT) | HESITANT GROUP | CONTINUED TO BE UNINTERESTED |
| HESITANT GROUP | PATTERN 3 (CONTRACT) | CONTRACT GROUP | CONTRACT |
| CONTRACT GROUP | (DUE TO FINAL STATE, NO TRANSITION) | | |

FIG. 3

| SESSION NUMBER | 0001 |
|---|---|
| USER ID | UID2344 |
| REFERENCE URL | REFERENCE TIME |
| http://www.AAA.com/index.htm | 02/12/2007 14:00:23 |
| http://www.AAA.com/01.htm | 02/12/2007 14:00:23 |
| http://www.AAA.com/02.asp | 02/12/2007 14:00:23 |
| ... | ... |
| INTENDED BEHAVIOR FLAG | 0 |
| BEHAVIOR CATEGORY | 0 |

FIG. 4

| CATEGORY NAME | | |
|---|---|---|
| NON-ACCESS GROUP | NUMBER OF PRESUMED USERS | 8000 |
| LESS-INTERESTED GROUP | NUMBER OF USERS | 2343 |
| | USER ID | LAST ACCESS TIME |
| | UID22003 | 02/12/2007 14:00:23 |
| | UID2344 | 02/12/2007 11:00:23 |
| | (OMITTED) | |
| PENDING GROUP | NUMBER OF USERS | 343 |
| | USER ID | LAST ACCESS TIME |
| | UID121 | 02/12/2007 14:00:23 |
| | UID54 | 02/12/2007 11:00:23 |
| | (OMITTED) | |
| HESITANT GROUP | NUMBER OF USERS | 560 |
| | USER ID | LAST ACCESS TIME |
| | UID1765 | 02/12/2007 14:00:23 |
| | UID2346 | 02/12/2007 11:00:23 |
| | (OMITTED) | |
| CONTRACT GROUP | NUMBER OF USERS | 1202 |
| | USER ID | LAST ACCESS TIME |
| | UID17643 | 02/12/2007 14:00:23 |
| | UID23465 | 02/12/2007 11:00:23 |
| | (OMITTED) | |

FIG. 5A

| | FIRST DAY | | | | |
|---|---|---|---|---|---|
| | NUMBER OF PRE-BEHAVIOR USERS | NUMBER OF VISITORS | BEHAVIOR PROBABILITY | TRANSITION DESTINATION | NUMBER OF TRANSITION USERS | TRANSITION PROBABILITY |
| NON-ACCESS GROUP | UNKNOWN | 2015 | | LESS-INTERESTED GROUP | 1505 | 0.746898 |
| | | | | PENDING GROUP | 411 | 0.20397 |
| | | | | CONTRACT GROUP | 99 | 0.049132 |
| | | | | TOTAL | 2015 | |
| LESS-INTERESTED GROUP | 0 | NUMBER OF REMAINING USERS 0 | | LESS-INTERESTED GROUP | | |
| | | | | PENDING GROUP | | |
| | | | | CONTRACT GROUP | | |
| | | | | TOTAL | | |
| PENDING GROUP | 0 | NUMBER OF REMAINING USERS 0 | | PENDING GROUP | | |
| | | | | HESITANT GROUP | | |
| | | | | CONTRACT GROUP | | |
| | | | | TOTAL | | |
| HESITANT GROUP | 0 | NUMBER OF REMAINING USERS 0 | | PENDING GROUP | | |
| | | | | HESITANT GROUP | | |
| | | | | CONTRACT GROUP | | |
| | | | | TOTAL | | |

| | SECOND DAY | | | | | THIRD DAY | | | |
|---|---|---|---|---|---|---|---|---|---|
| NUMBER OF PRE-BEHAVIOR USERS | NUMBER OF VISITORS | BEHAVIOR PROBABILITY | TRANSITION DESTINATION | NUMBER OF TRANSITION USERS | TRANSITION PROBABILITY | NUMBER OF PRE-BEHAVIOR USERS | NUMBER OF VISITORS | BEHAVIOR PROBABILITY | TRANSITION DESTINATION | NUMBER OF TRANSITION USERS | TRANSITION PROBABILITY |
| UNKNOWN | 1020 | | LESS-INTERESTED GROUP | 774 | 0.758824 | UNKNOWN | 510 | | LESS-INTERESTED GROUP | 365 | 0.715686 |
| | | | PENDING GROUP | 196 | 0.192157 | | | | PENDING GROUP | 125 | 0.245098 |
| | | | CONTRACT GROUP | 50 | 0.04902 | | | | CONTRACT GROUP | 20 | 0.039216 |
| | | | TOTAL | 1020 | | | | | TOTAL | 510 | |
| 1505 | 602 | 0.4 | LESS-INTERESTED GROUP | 390 | 0.647841 | 2067 | 812 | 0.39284 | LESS-INTERESTED GROUP | 531 | 0.653941 |
| | NUMBER OF REMAINING USERS 903 | | PENDING GROUP | 110 | 0.182724 | | NUMBER OF REMAINING USERS 1255 | | PENDING GROUP | 134 | 0.165025 |
| | | | CONTRACT GROUP | 102 | 0.169435 | | | | CONTRACT GROUP | 147 | 0.181034 |
| | | | TOTAL | 602 | | | | | TOTAL | 812 | |
| 411 | 398 | 0.96837 | PENDING GROUP | 100 | 0.251256 | 419 | 402 | 0.959427 | PENDING GROUP | 100 | 0.248756 |
| | NUMBER OF REMAINING USERS 13 | | HESITANT GROUP | 100 | 0.251256 | | NUMBER OF REMAINING USERS 17 | | HESITANT GROUP | 124 | 0.308458 |
| | | | CONTRACT GROUP | 198 | 0.497487 | | | | CONTRACT GROUP | 178 | 0.442786 |
| | | | TOTAL | 398 | | | | | TOTAL | 402 | |
| 0 | 0 | | PENDING GROUP | 0 | 0 | 100 | 30 | 0.3 | PENDING GROUP | 0 | 0 |
| | NUMBER OF REMAINING USERS 0 | | HESITANT GROUP | 0 | 0 | | NUMBER OF REMAINING USERS 70 | | HESITANT GROUP | 30 | 1 |
| | | | CONTRACT GROUP | 0 | 0 | | | | CONTRACT GROUP | 0 | 0 |
| | | | TOTAL | 0 | | | | | TOTAL | 30 | |

FROM FIG. 5A

FIG. 6A

| | FIRST DAY | | | | TO FIG. 6B |
|---|---|---|---|---|---|
| | NUMBER OF PRE-BEHAVIOR USERS | NUMBER OF VISITORS | BEHAVIOR PROBABILITY | NUMBER OF INTENDED BEHAVIOR USERS | INTENDED BEHAVIOR PROBABILITY |
| NON-ACCESS GROUP | UNKNOWN | 2015 | | 99 | 0.049131514 |
| LESS-INTERESTED GROUP | 0 | 0 | | | |
| PENDING GROUP | 0 | 0 | | | |
| HESITANT GROUP | 0 | 0 | | | |

FIG. 6B

| | SECOND DAY | | | | THIRD DAY | | | |
|---|---|---|---|---|---|---|---|---|
| NUMBER OF PRE-BEHAVIOR USERS | NUMBER OF VISITORS | BEHAVIOR PROBABILITY | NUMBER OF INTENDED BEHAVIOR USERS | INTENDED BEHAVIOR PROBABILITY | NUMBER OF PRE-BEHAVIOR USERS | NUMBER OF VISITORS | BEHAVIOR PROBABILITY | NUMBER OF INTENDED BEHAVIOR USERS | INTENDED BEHAVIOR PROBABILITY |
| UNKNOWN | 1020 | | | | UNKNOWN | 510 | | | |
| 1505 | 602 | 0.4 | 50 | 0.049019608 | 2067 | 812 | 0.39284 | 20 | 0.039215686 |
| 411 | 398 | 0.96837 | 102 | 0.169435216 | 419 | 402 | 0.959427 | 147 | 0.181034483 |
| 0 | 0 | | 198 | 0.497487437 | 100 | 30 | 0.3 | 178 | 0.44278607 |
| | | | 0 | | 0 | 0 | | 0 | 0 |

FROM FIG. 6A

FIG. 10A

FIRST DAY

| | NUMBER OF PRE-BEHAVIOR USERS | BEHAVIOR PROBABILITY | NUMBER OF VISITORS | | TRANSITION DESTINATION | TRANSITION PROBABILITY | NUMBER OF TRANSITION USERS |
|---|---|---|---|---|---|---|---|
| NON-ACCESS GROUP | 3000 | 0.568406 | 1705.219 | | LESS-INTERESTED GROUP | 0.740469 | 1262.662 |
| | | | | | PENDING GROUP | 0.213742 | 364.4763 |
| | | | | | CONTRACT GROUP | 0.045789 | 78.08015 |
| | | | | NUMBER OF REMAINING USERS 1294.781 | TOTAL | | 1705.219 |
| LESS-INTERESTED GROUP | 0 | 0.39642 | 0 | | LESS-INTERESTED GROUP | 0.650891 | 0 |
| | | | | | PENDING GROUP | 0.173874 | 0 |
| | | | | | CONTRACT GROUP | 0.175235 | 0 |
| | | | | NUMBER OF REMAINING USERS 0 | TOTAL | | 0 |
| PENDING GROUP | 100 | 0.963899 | 96.38985 | | PENDING GROUP | 0.250006 | 24.09807 |
| | | | | | HESITANT GROUP | 0.279857 | 26.97537 |
| | | | | | CONTRACT GROUP | 0.470137 | 45.31641 |
| | | | | NUMBER OF REMAINING USERS 3.610148 | TOTAL | | 96.38985 |
| HESITANT GROUP | 0 | 0.3 | 0 | | PENDING GROUP | 0 | 0 |
| | | | | | HESITANT GROUP | 1 | 0 |
| | | | | | CONTRACT GROUP | 0 | 0 |
| | | | | NUMBER OF REMAINING USERS 0 | TOTAL | | 0 |

| SECOND DAY | | | | | | | THIRD DAY | | | |
|---|---|---|---|---|---|---|---|---|---|---|
| NUMBER OF PRE-BEHAVIOR USERS | BEHAVIOR PROBABILITY | NUMBER OF VISITORS | TRANSITION DESTINATION | TRANSITION PROBABILITY | NUMBER OF TRANSITION USERS | NUMBER OF PRE-BEHAVIOR USERS | BEHAVIOR PROBABILITY | NUMBER OF VISITORS | TRANSITION DESTINATION | TRANSITION PROBABILITY | NUMBER OF TRANSITION USERS |
| 1294.781 | 0.666667 | 863.1876 | LESS-INTERESTED GROUP | 0.740469 | 639.164 | 431.5938 | 1 | 431.5938 | LESS-INTERESTED GROUP | 0.740469 | 319.582 |
| | | | PENDING GROUP | 0.213742 | 184.4992 | | | | PENDING GROUP | 0.213742 | 92.24959 |
| | | | CONTRACT GROUP | 0.045789 | 39.52444 | | | | CONTRACT GROUP | 0.045789 | 19.76222 |
| | | | TOTAL | | 863.1876 | | | | TOTAL | | 431.5938 |
| | | NUMBER OF REMAINING USERS 431.5938 | | | | | | NUMBER OF REMAINING USERS 0 | | | |
| 1262.662 | 0.39642 | 500.5444 | LESS-INTERESTED GROUP | 0.650891 | 325.7997 | 1727.081 | 0.39642 | 684.6495 | LESS-INTERESTED GROUP | 0.650891 | 445.632 |
| | | | PENDING GROUP | 0.173874 | 87.03188 | | | | PENDING GROUP | 0.173874 | 119.043 |
| | | | CONTRACT GROUP | 0.175235 | 87.71283 | | | | CONTRACT GROUP | 0.175235 | 119.9744 |
| | | | TOTAL | | 500.5444 | | | | TOTAL | | 684.6495 |
| | | NUMBER OF REMAINING USERS 762.1177 | | | | | | NUMBER OF REMAINING USERS 1042.432 | | | |
| 392.1846 | 0.963899 | 378.0261 | PENDING GROUP | 0.250006 | 94.50889 | 380.1984 | 0.963899 | 366.4727 | PENDING GROUP | 0.250006 | 91.62046 |
| | | | HESITANT GROUP | 0.279857 | 105.7933 | | | | HESITANT GROUP | 0.279857 | 102.5599 |
| | | | CONTRACT GROUP | 0.470137 | 177.724 | | | | CONTRACT GROUP | 0.470137 | 172.2923 |
| | | | TOTAL | | 378.0261 | | | | TOTAL | | 366.4727 |
| | | NUMBER OF REMAINING USERS 14.15844 | | | | | | NUMBER OF REMAINING USERS 13.72573 | | | |
| 26.97537 | 0.3 | 8.092612 | PENDING GROUP | 0 | 0 | 132.7686 | 0.3 | 39.83059 | PENDING GROUP | 0 | 0 |
| | | | HESITANT GROUP | 1 | 8.092612 | | | | HESITANT GROUP | 1 | 39.83059 |
| | | | CONTRACT GROUP | 0 | 0 | | | | CONTRACT GROUP | 0 | 0 |
| | | | TOTAL | | 8.092612 | | | | TOTAL | | 39.83059 |
| | | NUMBER OF REMAINING USERS 18.88276 | | | | | | NUMBER OF REMAINING USERS 92.93804 | | | |

FIG. 11A

FIRST DAY

| | NUMBER OF PRE-BEHAVIOR USERS | BEHAVIOR PROBABILITY | NUMBER OF VISITORS | INTENDED BEHAVIOR PROBABILITY | NUMBER OF INTENDED BEHAVIOR USERS |
|---|---|---|---|---|---|
| NON-ACCESS GROUP | 3000 | 0.568406 | 1705.219 | 0.045789 | 78.08015 |
| LESS-INTERESTED GROUP | 0 | 0.39642 | 0 | 0.175235 | 0 |
| PENDING GROUP | 100 | 0.963899 | 96.38985 | 0.470137 | 45.31641 |
| HESITANT GROUP | 0 | 0.3 | 0 | 0 | 0 |

| | SECOND DAY | | | | | THIRD DAY | | | |
|---|---|---|---|---|---|---|---|---|---|
| NUMBER OF PRE-BEHAVIOR USERS | BEHAVIOR PROBABILITY | NUMBER OF VISITORS | INTENDED BEHAVIOR PROBABILITY | NUMBER OF INTENDED BEHAVIOR USERS | NUMBER OF PRE-BEHAVIOR USERS | BEHAVIOR PROBABILITY | NUMBER OF VISITORS | INTENDED BEHAVIOR PROBABILITY | NUMBER OF INTENDED BEHAVIOR USERS |
| 1294.781 | 0.666667 | 863.1876 | 0.045789 | 39.52444 | 431.5938 | 1 | 431.5938 | 0.045789 | 19.76222 |
| 78.08015 | 0.39642 | 30.95253 | 0.175235 | 5.423961 | 706.4383 | 0.39642 | 280.0462 | 0.175235 | 49.07386 |
| 392.1846 | 0.963899 | 378.0261 | 0.470137 | 177.724 | 298.5484 | 0.963899 | 287.7703 | 0.470137 | 135.2914 |
| 26.97537 | 0.3 | 8.092612 | 0 | 0 | 132.7686 | 0.3 | 39.83059 | 0 | 0 |

FROM FIG. 11A

USER STATE PRESUMPTION SYSTEM, USER STATE PRESUMPTION METHOD, AND RECORDING MEDIA STORING USER STATE PRESUMPTION PROGRAM

CROSS-REFERENCE TO RELATED APPLICATIONS

This application is related to and claims priority to Japanese Patent Application No. 2007-210927 filed on Aug. 13, 2007 in the Japan Patent Office, and incorporated by reference herein.

BACKGROUND

1. Field

The embodiments discussed herein are directed to a user state presumption system, a user state presumption method, and a computer-readable recording medium storing a user state presumption program causing a computer to presume the state of a user on the basis of data indicating access histories of a plurality of users whose computers have accessed a server.

2. Description of the Related Art

For example, behaviors of website users differ from individual to individual. However, in a case where website users are grouped into category groups of users having common characteristics, users belonging to the same category group may exhibit a common behavior pattern. For example, in the case that "a degree of interest in a website", which degree is one of user characteristics, is measured, the following tendencies can be founds users in a category group of users with a high degree of interest tend to stay at the website for a long time, whereas users in a category group of users with a low degree of interest tend to stay at the website for a short time.

For example, in the case that the characteristics of an individual user of a website providing a product sales service are acquired, an operator of the website is able to carry out measures, such as changing of a page to be displayed on the basis of the characteristics of the user. Thus, the operator can increase the probability that the user will purchase a product or the degree that the users will be satisfied. Even in a case where the characteristics of an individual user cannot be specified, if the proportion of users who have certain characteristics among all users can be presumed, the operator of the website is able to carry out measures, such as changing of an advertisement to be displayed, so as to increase both the probability that the users will purchase products and the degree that the users will be satisfied.

When the above-mentioned website providing a product sales service is compared with in-person retail sales in stores, the presuming the characteristics of a website user corresponds to the way in which a resourceful salesperson in a store sells. The resourceful salesperson understands both preferences and desires of a customer through conversation with the customer and properly guides a customer to a desired product. In addition, presuming the characteristics of a website user group corresponds to the way in which a salesperson in a store. The resourceful salesperson understands both strong points and weak points of a product for sale, with which competing products are likely to be compared, and rise and decline of fads, and the like through conversation with many customers. Accordingly, obtained information, by presuming the characteristics of the website user group, can be properly fed back to production and sales plans for products.

For example, in a case where a campaign for a particular product is carried out on a website, it is important to understand user characteristics such as the degree of interest in the product, the degree of comprehension of the product, and the intention of purchasing the product, to judge measures to acquire users in the campaign. In the case that the user characteristics include both a low degree of comprehension and a low degree of interest, measures for strengthening advertising to increase name recognition are effective. On the other hand, in the case that the user characteristics includes a degree of comprehension of the product is high but a degree of interest is low, measures, such as price reduction, are effective.

The above-described user characteristics, such as the degree of interest and the degree of comprehension, can be presumed on the basis of questionnaire surveys Conventionally, in a model, before purchasing a product, a consumer goes through intermediate stages, such as "attention", "brand comprehension", "attitude", "intention", and the like, and such consumer states "can be measured on the basis of consumer surveys, such as questionnaires".

Conventionally, acquiring characteristics of website users, such as preferences and interests, and distributing advertisements corresponding to the characteristics of the website users, a technique such as behavioral targeting advertisement (abbreviated as "BTA") has been available.

Behavioral targeting advertisement may be defined as a "new marketing procedure for grouping users into segments on the basis of behavioral history information on a website and distributing optimal advertisements according to the segments".

In addition, conventionally, the BTA server described below is discussed as an example of behavioral targeting advertisement. That is, on the basis of both user IDs of website users and information on URLs of web pages referred to by the website users, the BTA server allocates a segment ID for a particular area to a user ID of a user who frequently browses web pages in the particular area, such as automobiles or cosmetics. The BTA server includes a database for controlling which segment IDs are to be allocated to individual user IDs. Accordingly, advertisements corresponding to segment IDs can be distributed to users who have segment IDs responding user IDs.

Measures that can be taken by understanding behaviors of users are not only applied to distribution of advertisements. Thus, in this specification, a general technique for grouping users into segments on the basis of behavioral history information of the users will be referred to as a behavioral targeting technique, without being limited to an advertising application. As a behavioral targeting technique, for example, a system for providing information, a product, and a service suitable for a user on the basis of a user behavior, such as the number of times the user has visited a particular homepage, and user information, such as the age of the user, has been discussed.

However, as described above, it is difficult to perceive how characteristics of a user change on the basis of a behavior of the user for browsing information. The characteristics of a user may change depending on browsing of information on a website or interaction with the website.

A case where a commission discount campaign is available for foreign currency deposits on a bank's website will be discussed as an example of a change in characteristics of a user. In the case of purchasing a high-risk service, such as a foreign currency deposit, even if a discount campaign is available, users cannot casually purchase the service. A certain level of decision-making is necessary for users to purchase such a service. For a campaign for such a service, a plurality of explanatory pages for explaining characteristics and risks of purchasing the service exist on a website. Thus, it is assumed that many users carefully browse such explanatory pages to help their decision-making.

After a user has carefully browsed such explanatory pages, user characteristics, such as the degree of interest in the service and the intention of purchasing the service, change. For example, as a result of browsing of such explanatory pages, some users come to fully comprehend the service and their intention of purchasing the service is increased, whereas some users come to lose their interest in the service after comprehending the service.

In the BTA described conventionally, for example, users who frequently browsed web pages of a particular area are grouped into a segment of users who have a high degree of interest in the particular area. Thus, the users in the segment of users who have a high degree of interest become targets for advertising of the particular area. However, some users belonging to the segment of users who have a high degree of interest may have judged that products in the particular area are not worth purchasing after browsing the web pages of the particular area. That is, it is difficult to understand how the characteristics of a user who frequently browses the web pages of the particular area change.

SUMMARY

The embodiments discussed herein provide a user state presumption system including a category storage which stores state data indicating to which states, defined in advance, a plurality of users, who accessed a server providing a service via a network belong; a transition model recorder which records, for a transition between the states defined in advance, transition condition data indicating a user behavior pattern serving as a condition for changing of a user from a certain state to another state; a log receiver which reads an access log containing data identifying the plurality of users who accessed the server, data indicating information referred to by the plurality of users and reference times at which the plurality of users referred to the information; a log abstracting part which detects, for each of the plurality of users, beginning and ending of a series of accesses made by the user on the basis of the access log read by the log receiver and abstracts, for a series of accesses made by the user, access history data containing data identifying information referred to by the user in the series of accesses; a behavior categorizing part which categorizes, on the basis of the information referred to by the user in the series of accesses indicated by the access history data abstracted by the log abstracting part, a behavior of the user in the series of accesses into one of a plurality of behavior patterns defined in advance; a category presuming part which presumes how a state of each of the plurality of users indicated by the state data stored in the category storage changes by comparing the behavior pattern of the user determined by the behavior categorizing part with the user behavior pattern serving as the condition for the transition between the states indicated by the transition condition data recorded in the transition model recorder and updates the state data on the basis of a result of the presumption; a transition probability storage which stores a transition probability of a user transition between the states defined in advance; a transition probability calculator which calculates, every predetermined period, the transition probability of the user transition between the states defined in advance by referring to the state data and stores the obtained transition probability in the transition probability storage; an intended behavior judging part which judges, on the basis of the access history data abstracted by the log abstracting part, whether the user has exhibited a specific intended behavior that is an aim of the service provided by the server in the series of accesses; an intended behavior probability recorder which records the proportion of users who have exhibited the intended behavior among users in individual states; and an intended behavior probability calculator which calculates, every predetermined period, the proportion of users who have exhibited the intended behavior among the plurality of users in the individual states on the basis of a result of the judgment obtained by the intended behavior judging part and the state data and records the obtained proportion in the intended behavior probability recorder.

The above aspects can be attained by a user state presumption method including storing data indicating a state of a user who accessed a server; recording transition condition data indicating a user behavior pattern; detecting a beginning and an ending of accesses made by the user based on an access log and abstracting access history data; and determining, on the basis of the access history data, whether the user has exhibited a specific behavior that is an aim of the service provided by the server; and outputting the determination.

These together with other aspects and advantages which will be subsequently apparent, reside in the details of construction and operation as more fully hereinafter described and claimed, reference being had to the accompanying drawings forming a part hereof wherein like numerals refer to like parts throughout.

BRIEF DESCRIPTION OF THE DRAWINGS

FIG. 2B is a table showing an example of the states represented by the category groups and the transition rules regarding the transition between the states shown in FIG. 2A;

FIG. 3 shows an example of access history data abstracted for a single session;

FIG. 4 illustrates an example of state data to be stored in a category storage;

FIGS. 5A and 5B illustrate transition probability data to be stored in a transition probability storage;

FIGS. 6A and 6B illustrate an example of data to be recorded in an intended behavior probability recorder;

FIGS. 10A and 10B illustrate an example of transition simulation data;

FIGS. 11A and 11B illustrate an example of intended behavior simulation data.

DETAILED DESCRIPTION OF THE EMBODIMENTS

Figure 1:
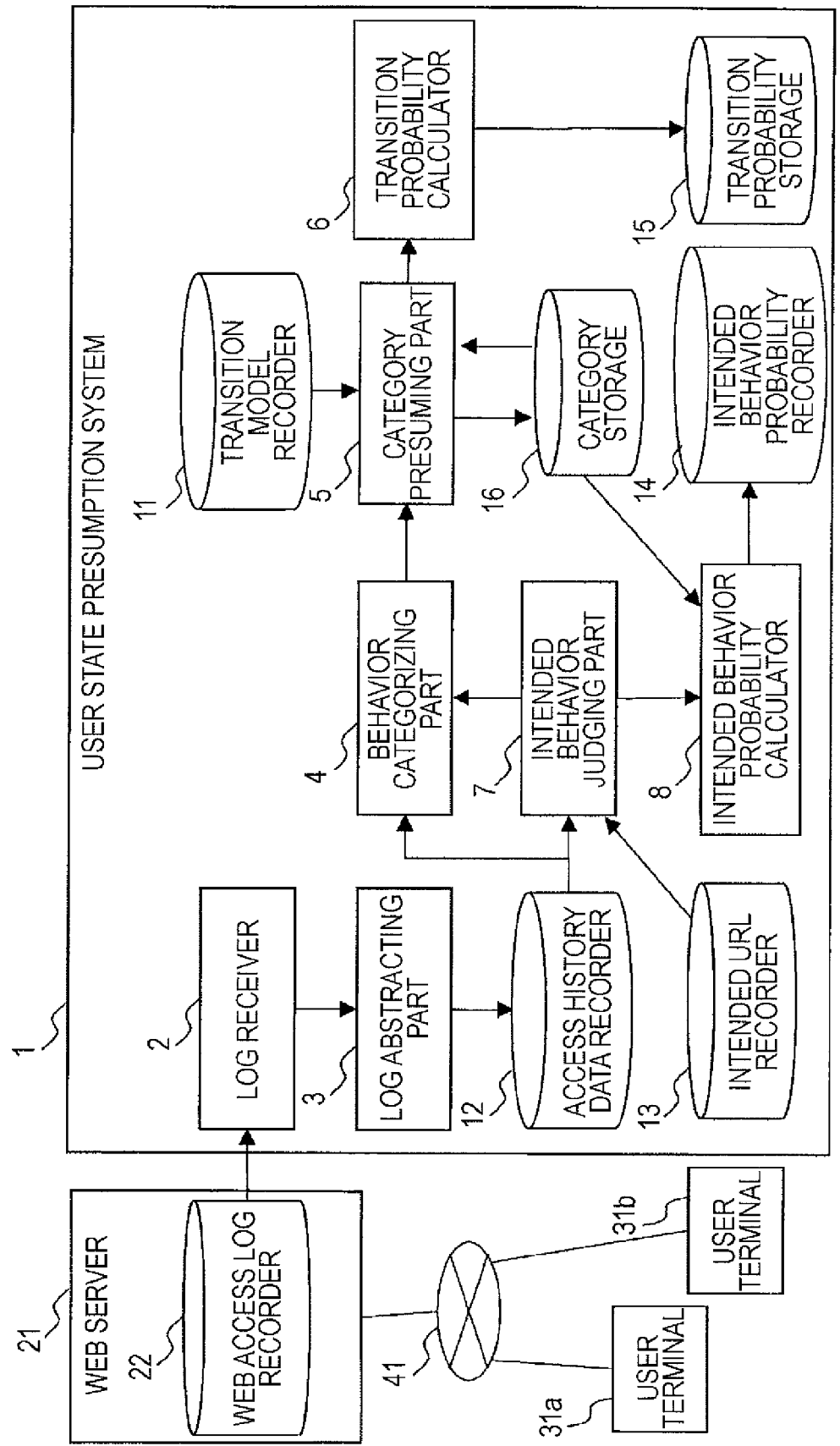
FIG. 1 illustrates an example of the configuration of a user state presumption system according to an exemplary embodiment.

FIG. 1 illustrates an example of the configuration of a user state presumption system 1 according to an exemplary embodiment. Referring to FIG. 1, the user state presumption system 1 may be connected to a web server 21. The web server 21 may be connected to the Internet 41. User terminals 31a and 31b used by users may be connected to the Internet 41. For example, web browsers may be installed in each of the user terminals 31a and 31b. Thus, with the use of the web browsers installed in the user terminals 31a and 31b, the users are able to access a website provided by the web server 21 via the Internet 41. In an embodiment, a case where communication between the web server 21 and each of the user terminals 31a and 31b may be performed mainly using a hypertext transfer protocol (HTTP) will be described by way of an example. In addition, a website includes a plurality of web pages. Thus, each web page serves as a unit of information that can be referred to by a user.

The web server 21 provides a service, such as selling of a product, on a website for a plurality of users. In addition, the web server 21 includes a web access log recorder 22 for recording access logs representing histories of user access to the website made by the users.

The user state presumption system 1 includes a component to read access logs from the web access log recorder 22, a component analyze how a user of a service provided on a website goes through states defined in advance, and a component analyze a relationship between an intended behavior (for example, purchase of a product) performed by the user and a transition in the state of the user. The intended behavior serves as the aim of the service provided on the website.

Thus, the user state presumption system 1 includes a log receiver 2, a log abstracting part 3, a behavior categorizing part 4, a category presuming part 5, a transition probability calculator 6, an intended behavior judging part 7, an intended behavior probability calculator 8, a transition model recorder 11, an access history data recorder 12, an intended URL recorder 13, an intended behavior probability recorder 14, a transition probability storage 15, and a category storage 16.

In the user state presumption system 1, both a plurality of states of a website user may go through before reaching an intended behavior and transition condition data indicating a transition rule regarding a transition between the states are defined in advance and are recorded in the transition model recorder 11. It is desirable that the plurality of states and the transition rule between the states are determined in accordance with the details of a service to be provided on the website. An example for determining transition condition data to be recorded in advance in the transition model recorder 11 will be described below.

In this example, a case where a service to be provided on the website is selling of a product, a certain level of decision-making is necessary for a user to purchase the product, and the user rarely purchases the product repeatedly will be described. In this case, the intended behavior to be exhibited by the user is purchase of the product. In addition, a case where a transition in the state of the user when a service operator carries out a limited-time campaign offering discount or a free gift as incentives on the website in order to promote the product is analyzed by using the user state presumption system 1 will be described.

In the case of planning a campaign on a website, a service operator should consider how the proportion of users who make a purchase of an intended product (hereinafter, referred to as "contract") among users who access the website can be increased. An index called "conversion ratio" representing such a proportion can be used. Computation of the conversion ratio can be implemented using various known weblog analysis tools. However, it is difficult to calculate a future effect on the basis of the conversion ratio computed in a previous campaign. This is because even if campaigns are carried out under the same conditions, the degree of interest and the degree of comprehension of a user for a product may have changed since the last campaign and the same effect cannot be expected. In addition, a requirement for the product should change depending on the user, and the degree of knowledge of the product should differ from a user to a user.

Thus, the user state presumption system 1 according to an embodiment presumes the state of each user, such as the degree of interest and the degree of comprehension, and analyzes which state the user goes through before making a contract. Thus, the service operator is able to calculate a future effect correctly compared with a case where calculation may be performed using the conversion ratio on the basis of a previous campaign case. In order to achieve such analysis, for example, states that a user may go through before making a contract can be grouped into a plurality of category groups, as described below.

In an embodiment, two user characteristics which are the degree of interest and the degree of comprehension are used as user characteristics regarding the conversion ratio. For example, for a high-risk service, such as a foreign currency deposit, even if a discount campaign is available, users cannot casually purchase the service (that is, users cannot casually make a contract). A certain level of decision-making is necessary for users to make a contract. Users who are simply highly interested in foreign currency deposits do not necessarily make a contract. Users who have little knowledge of the service should carefully refer to information pages on the website so as to comprehend the service. As a result of browsing of such information pages, some users come to fully comprehend the service and their intention of making a contract is increased, whereas some users come to lose their interest in the service after comprehending the characteristics of the service. Thus, in view of the two characteristics which are the degree of interest and the degree of comprehension, states that a user may go through before making a contract can be grouped into, for example, four category groups which are an "uninterested group", an "interested group", a "pending group", and a "hesitant group". Users who belong to the "uninterested group" have little comprehension of the service and are little interested in the service. Users who belong to the "interested group" have little comprehension of the service but are highly interested in the service. Users who belong to the "pending group" have much comprehension of the service and are highly interested in the service but do not make a purchase. Users who belong to the "hesitant group" have much comprehension of the service but are little interested in the service.

In an embodiment, in order to facilitate analysis to be performed by the user state presumption system 1, with respect to the above-described categorization, a "non-access group" is introduced, the "interested group" is omitted, and the "uninterested group" is replaced with a "less-interested group". In addition, five category groups, the "non-access group", the "less-interested group", the "pending group", the "hesitant group", and the "contract group", are defined as described below. That is, a category group set S used in this embodiment includes the five category groups. Users who belong to the "non-access group" are users who have not accessed web pages relating to a campaign product. Users who belong to the "less-interested group" are users who have glanced at the related web pages and ended the access to the web pages. Users who belong to the "pending group" are users who have carefully browsed the related web pages but have not made a contract. Users who belong to the "hesitant group" are users who have not made a contract after the subsequent access among the users who belong to the "pending group". Users who belong to the "contract group" are users who purchased the campaign product.

The "non-access group" is added as a category group for the reason described below. That is, in a case where a category group to which a user belongs is presumed only from page reference indicated by access logs, since no access log of a user who has not accessed a web page exists, information on the user regarding the degree of comprehension and the degree of interest cannot be acquired. Thus, by providing as the category group "non-access group" to which users who have not accessed a web page belong, the state of a user who has not accessed a web page can be handled.

The user state presumption system 1 according to an embodiment analyzes, for example, how the state of a user changes among the five state groups during a period from the first access to a website to making of a contract, on the basis of an access log on the website.

Figure 2A:
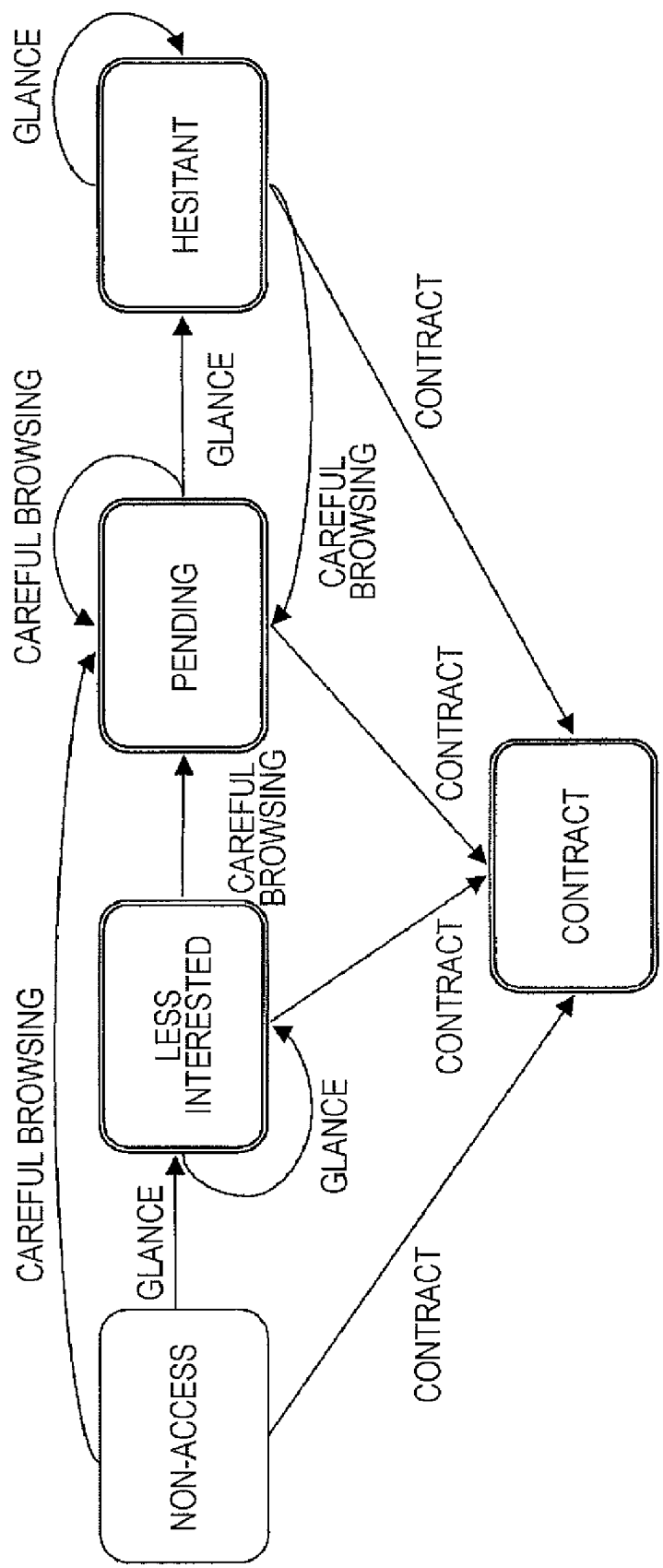
FIG. 2A is a state transition diagram schematically showing states represented by category groups and transition rules regarding a transition between the states.

FIG. 2A is a state transition diagram schematically showing states represented by the five category groups and transition rules regarding transitions between the states (conditions for transition from a state represented by a category group to a different state represented by a different category group). Referring to FIG. 2A, for example, in a case where a user who belongs to the "non-access group" accesses a related web page, if the user carefully browses the related web page, it is determined that the degree of interest and the degree of comprehension increase and the state of the user is changed into the state represented by the "pending group". If the user who belongs to the "non-access group" glances at the related web page, it is determined that the degree of interest and the degree of comprehension are low and the state of the user is changed into the state represented by the "less-interested group". If the user who belongs to the "non-access group" makes a contract, the state of the user is changed into the state represented by the "contract group".

Similarly, in a case where a user who belongs to the "less-interested group" accesses a related web page, if the user carefully browses the related web page, the state of the user is changed into the state represented by the "pending group". If the user who belongs to the "less-interested group" makes a contract, the state of the user is changed into the state represented by the "contract group". If the user who belong to the "less-interested group" glances at the related web page, the state of the user remains in the state represented by the "less-interested group".

In addition, in a case where a user who belongs to the "pending group" accesses a related web page, if the user glances at the related web page, the state of the user is changed into the state represented by the "hesitant group". If the user who belongs to the "pending group" makes a contract, the state of the user is changed into the state represented by the "contract group". If the user who belongs to the "pending group" carefully browses the related web page, the state of the user remains in the state represented by the "pending group".

In addition, in a case where a user who belongs to the "hesitant group" accesses a related web page, if the user carefully browses the related web page, the state of the user is changed into the "pending group". If the user who belongs to the "hesitant group" makes a contract, the state of the user is changed into the state represented by the "contract group". If the user who belongs to the "hesitant group" glances at the related web page, the state of the user remains in the state represented by the "hesitant group". The behavior categorizing part 4 determines whether the user carefully browsed or glanced at a related web page by a series of accesses made by each user (in this embodiment, for example, each session), as described below.

The above-described states are represented by the plurality of category groups. And the transition condition data indicates the transition rules regarding transitions between the states. The states and the transition rules are recorded in advance in the transition model recorder 11. On the basis of the transition condition data recorded in the transition model recorder 11, the user state presumption system 1 analyzes how the category to which a user belongs transits before making a contract. Thus, a service operator (hereinafter, referred to as an operator of a website) is able to acquire information regarding a state in which many users remain before making a contract and the like. For example, if many users belong to the "less-interested group", the operator of the website is able to judge that advertising should be strengthened in order to increase name recognition of the product. If many users belong to the "hesitant group", the operator of the website is able to judge that measures, such as cost reduction or the like, are effective.

The categorization of user states and the transition rules are not necessarily limited to the examples described above. For example, in the case of a campaign product that is often purchased repeatedly, for example, a "first-time purchase group" and a "repeated purchase group" can be added as category groups. In addition, user characteristics serving as the criteria of categorization of the states are not necessarily limited to the degree of interest and the degree of comprehension. For example, categorization can be made on the basis of the degree of user maintainability or the like. As described above, the operator of the website is able to decide the categorization of user states and the transition rules in accordance with an intended behavior to be exhibited by users.

An exemplary user state presumption system 1 will now be described with reference to FIG. 1. The log receiving part 2 reads access logs representing histories of access to a website from the web access log recording part 22.

An access log includes data identifying a user who has accessed the website provided by the web server 21, data indicating information referred to by the user, and date and time at which the information was referred to by the user. For example web server 21, data indicating information referred to by the user, and date and time at which the information was referred to by the user. For example, the web server 21 is capable of recording a user ID of a user as an access log, the URL of a web page referred to by the user, and reference date and time at which the user referred to the web page in association with each other on the basis of an HTTP request transmitted from the user terminal 31*a* or 31*b*.

For example, in the case that the user terminal 31*a* or 31*b* accesses a web page, the web server 21 receives a user ID recorded in Cookie information of the browser of the user terminal 31*a* or 31*b*. Accordingly, the web server 21 is capable of acquiring the user ID. In addition, for example, the web server 21 is capable of performing long-term tracking of accesses made by individual users by using a feature of BASIC authentication. Access logs are not necessarily generated by the web server 21. A different server may acquire data indicating access histories from the user terminals 31*a* and 31*b* and generates access logs on the basis of the acquired data.

The log abstracting part 3 detects, from an access log read by the log receiver 2, the beginning and the ending of a series of accesses made by each user and abstracts, for each series of accesses made by the user, access history data containing URLs referred to by the user in the series of accesses. Here, a series of accesses made by a user refers to accesses that are regarded as being a series of behaviors in a period from the beginning to the ending of the use of a certain service when the user accesses a server to use the service.

As described above, as a method for identifying a series of accesses representing a series of behaviors of a user, for example, a technique is available in which a web server identifies accesses to a website made by a user as a single session.

In an embodiment, a case where the log abstracting part 3 abstracts the beginning and the ending of a session will be described as an example. For example, in the case that two consecutive accesses made by a user occur with a time interval of a threshold value t or less (for example, t=30 minutes), the log abstracting part 3 determines that the two consecutive accesses are included in a single session. On the other hand, in the case that two consecutive accesses made by a user occur with a time interval of more than the threshold value t, the log abstracting part 3 determines that the second access is the beginning of a new session which is different from a session including the first access. Alternatively, the log abstracting part 3 may detect the beginning of a session on the basis of an explicit login history provided by a user in an access log and the ending of the session on the basis of a logout history. In this case, it is necessary that an access log contain data indicating login and logout of the user.

A method for detecting the beginning and the ending of a session is not necessarily limited to the above-described method. For example, in a case where a session ID identifying a session is contained in an access log, the log abstracting part 3 is capable of detecting the beginning and the ending of the session on the basis of the session ID.

The log abstracting part 3 abstracts, for each session detected as described above, for example, data indicating a list of sets of two factors, URLs referred to by a user and the dates and times at which the URLs were referred to, as access history data. FIG. 3 shows an example of access history data abstracted for a single session. In the example shown in FIG. 3, the log abstracting part 3 abstracts, as access history data for the session, a session number identifying the session, a user ID identifying a user, a list of sets of two factors, reference URLs referred to by the user within the session and the dates and times at which the URLs were referred to, an intended behavior flag (described later), and a behavior category (described later). The abstracted access history data is recorded in the access history data recorder 12.

The intended behavior judging part 7 judges, for each session, whether an intended URL recorded in advance in the intended URL recorder 13 exists in reference URLs in access history data. Accordingly, the intended behavior judging part 7 is capable of judging, for each session, whether a user has performed an intended behavior. If it is judged that the user has performed the intended behavior, the intended behavior judging part 7 updates the intended behavior flag contained in the access history data for the user from "0" to "1".

In the intended URL recorder 13, the URL of a web page referred to when a user performs an intended behavior is recorded. For example, in this embodiment, the URL of a web page to be accessed by a user in order to make a contract which is the aim of a campaign on a website is recorded as the intended URL. The intended behavior includes, for example, purchase of a product or registration for membership.

The behavior categorizing part 4 categorizes behaviors of users in individual sessions into behavior patterns which constitute a behavior pattern set A defined in advance, on the basis of reference URLs referred to in the individual sessions and intended behavior flags represented by the access history data abstracted by the log abstracting part 3. The behavior pattern set A includes, for example, the patterns:

Pattern 1: "careful browsing & no contract" User carefully browsed explanatory pages for a product but did not make a contract;

Pattern 2: "glance & no contract" User glanced at explanatory pages for a product and did not make a contract; and Pattern 3: "contract" User made a contract.

In order to categorize a behavior of a user in each session into one of patterns 1 to 3 as described above, the behavior categorizing part 4 acquires, on the basis of an intended behavior flag recorded in access history data of the user, information indicating whether or not the user has performed the intended behavior "contract" in the session. In the case of a session for which the intended behavior flag indicates that a user has made a contract, the behavior categorizing part 4 categorizes the behavior pattern of the user into pattern 3 "contract".

In the case of a session indicating that a user has not made a contract, the behavior categorizing part 4 categorizes the behavior of the user represented by the access history data into a pattern in which the user carefully browsed web pages related to a campaign or a pattern in which the user glanced at web pages related to a campaign. For example, if it is judged that the behavior of the user is categorized into the pattern in which the user carefully browsed the web pages related to the campaign, "1" is recorded as a "behavior category" in the access history data shown in FIG. 3. On the other hand, if it is judged that the behavior of the user is categorized into the pattern in which the user glanced at the web pages related to the campaign, "0" is recorded as a "behavior category" in the access history data shown in FIG. 3.

Such categorization can be achieved by, for example, computation using an item response theory. An example of the categorization method to which the item response theory is applied will be described later. Instead of the categorization method employing the item response theory, for example, the behavior pattern of a user in each session can be categorized in accordance with a method based on the number of reference web pages referred to in the session and the periods during which the user stayed at the web pages.

In a case where categorization may be performed on the basis of a number of web pages to which web users have referred, for example, a user behavior in which the number is only one is categorized into a "brief-look behavior". A behavior in which the number is two or more and less than six pages is categorized into a "medium-term behavior". A behavior in which the number is six or more pages is categorized into a "long-term behavior". In addition, in a case where categorization may be performed on the basis a time during which the user stayed at a web page, for example, a behavior in which the user stayed at the web page for less than five minutes is categorized into an "immediate-withdrawal behavior". A behavior in which the user stayed at the web page for five or more and less than twenty minutes is categorized into a "standard behavior". A behavior in which the user stayed at the web page for twenty or more minutes is categorized into an "overstay behavior".

As described above, after the behavior of the user is categorized into one of the behavior patterns "careful browsing" and "glance", the behavior pattern of the user in the session not belonging to pattern 3 is categorized into one of patterns 1 and 2. Accordingly, the behavior categorizing part 4 is capable of categorizing behavior patterns of users in individual sessions into patterns 1 to 3.

To categorize regarding user behavior pattern groups as patterns 1 to 3, are merely an example. Behavior patterns constituting the behavior pattern set A are not necessarily limited the above-mentioned patterns. For example, the behavior categorizing part 4 is capable of categorizing behavior patterns of users in individual sessions into a beginner pattern and an expert pattern on the basis of access history data.

The category presuming part 5 presumes changes in the states of users in individual sessions on the basis of the behavior patterns categorized by the behavior categorizing part 4. The category storage 16 stores state data indicating the states of users. The category presuming part 5 presumes how the states of users change in individual sessions on the basis of both the state data stored in the category storage 16 and the behavior patterns of the users in the sessions categorized by the behavior categorizing part 4. In this case, the category presuming part 5 compares transition rules regarding transitions between the states represented by the transition condition data recorded in the transition model recorder 11 with the behavior patterns of the users in the sessions and presumes how the states of the users change. The category presuming part 5 updates the state data stored in the category storage 16 on the basis of the presumed changes in the states of the users.

FIG. 4 illustrates an example of state data to be stored in the category storage 16. The state data shown in FIG. 4 contains the numbers of users who belong to four category groups, user IDs of the users, and last access times of the users. The four category groups are the less-interested group, the pending group, the hesitant group, and the contract group in the category group set S except for the non-access group. For the non-access group, the number of presumed users who are presumed to belong to the non-access group is recorded.

For example, in the initial stage before an access log is acquired, for example, at the start of a campaign on a website, only the approximate number of presumed non-access users is recorded in the state data shown in FIG. 4. Then, when the campaign starts and the log receiver 2 starts reading of access logs, on the basis of the read access log, the log abstracting part 3, the behavior categorizing part 4, and the intended behavior judging part 7 start to calculate behavior patterns of users in individual sessions. Then, the category presuming part 5 determines to which category groups the users in the individual sessions belong, on the basis of both the behavior patterns of the users in the individual sessions categorized by the behavior categorizing part 4 and the transition condition data recorded in the transition model recorder 11. And the category presuming part 5 records the determined category groups in the state data. Accordingly, user IDs of users who belong to individual category groups are recorded in the state data. In addition, the total number of user IDs recorded in each of the less-interested group, the pending group, the hesitant group, and the contract group is recorded in the state data as the number of users who belong to the individual category groups.

For example, the five category groups representing the states shown in the state transition diagram of FIG. 2A and transition condition data indicating transition rules regarding transitions between the states are recorded in advance in the transition model recorder 11. The transition condition data defines a set of transition rules describing to which category group a user who is in a state represented by a category s (s∈category group set S) is changed after going through a session of a behavior pattern a (a∈behavior pattern set A). FIG. 2B is a table showing an example of the details of transition condition data corresponding to the transition state diagram shown in FIG. 2A.

The transition condition data shown in FIG. 2B including a transition rule in which a pre-behavior category group, an in-session behavior pattern, and a post-behavior category group are associated with each other is recorded in the transition model recorder 11. The "explanation" field in FIG. 2B is provided in order to clarify the details of the transition condition data. The contents of the "explanation" field are not necessarily recorded as transition condition data. As is clear from FIG. 2B, in a case where a user who belongs to a "pre-behavior category group" before the start of a session behaves as defined by an "in-session behavior pattern", the category group to which the user belongs is changed into a "post-behavior category group".

For example, the first row of FIG. 2B defines that, in a case where a user who belongs to a "non-access group" behaves as indicated by pattern 1 "careful browsing & no contract" in a session in which the user first accesses a website, the category group to which the user belongs is changed into a "pending group".

That is, each "in-session behavior pattern" serving as a condition under which a category group is changed from a "pre-behavior category group" to a "post-behavior category group" is recorded as a transition rule, in the form of a combination of "pre-behavior category group" and "pos-behavior category group" (that is, a combination of transition source category group and transition destination category group). It is desirable that transition rules are recorded so that all the category combinations that can be presumed for transitions are covered. The details of the transition condition data are not necessarily limited to the details shown in FIG. 2B.

A case where the category presuming part 5 presumes a transition in the state of a user in a session on the basis of the transition condition data will now be described. The category presuming part 5 acquires a category group to which the user belonged before the start of the session on the basis of the state data stored in the category storage 16. Then, the category presuming part 5 compares an "in-session behavior pattern" for a "pre-behavior category group" corresponding to the acquired category group with a behavior pattern of the user in the session categorized by the behavior categorizing part 4. The category presuming part 5 acquires a "post-behavior category group" that satisfies a transition rule for the behavior pattern of the user in the session, and updates the state data in such a manner that the "post-behavior category group" serves as a category group to which the user belongs after the session.

As described above, the category presuming part 5 is capable of presuming, for each session, to which category group the user who belongs to a certain category group is changed, and updating information on the state data stored in the category storage 16. Accordingly, the category presuming part 5 is capable of presuming a transition in the state of a user between before and after a session. Thus, for example, when the log receiver 2 periodically receives access logs and the log abstracting part 3, the behavior categorizing part 4, the intended behavior judging part 7, and the category presuming part 5 periodically operate, state data stored in the category storage 16 and representing category groups to which individual users belong are periodically updated on the basis of the access logs.

A mechanism for analyzing and estimating an information browsing behavior of a user in a session can be implemented by the behavior categorizing part 4 and the category presuming part 5. That is, the behavior categorizing part 4 and the category presuming part 5 are capable of reading a change in the characteristics of the user, from an access log, on the basis of a behavior of the user for referring to information on a website, and causing state data to reflect the change in the characteristics of the user. Thus, for example, the behavior categorizing part 4 and the category presuming part 5 are capable of acquiring user characteristics that can be changed due to an active behavior of the user, such as a behavior for referring to information of a web page, as well as user characteristics that can be changed due to a certain event, such as a commercial or member registration. Furthermore, the behavior categorizing part 4 and the category presuming part 5 are capable of causing state data to reflect a change in such user characteristics.

The transition probability calculator 6 periodically calculates, on the basis of the state data, a transition probability indicating a probability of a category group to which a user belongs being changed to a different category group, and stores the obtained transition probability in the transition probability storage 15. That is, the transition probability calculator 6 calculates, every predetermined period (every unit time), the proportion of users who belong to a certain category group and are changed to a different category group in a session in which the users access a website, on the basis of the state data stored in the category storage 16, and stores the obtained proportion in the transition probability storage 15.

For example, every day, the transition probability storage 15 calculates, for each category group, the proportion of users who started a session. The transition probability storage 15 also calculates, every day, the probability of users who started a session in a certain category group being changed to a different category group on the basis of combinations of before-transition category groups and after-transition category groups. For each category group, the proportion of users who started a session in the category group and transition probabilities indicating probabilities of transitions between individual category groups, which are obtained every day, are stored in the transition probability storage 15.

A method to be performed by the transition probability calculator 6 for calculating transition probabilities is not necessarily limited to the above-described example. For example, in the case of presuming a transition in the state of a user in each session, the category presuming part 5 records data indicating histories of transition rules referred to. The transition probability calculator 6 may calculate a transition probability on the basis of the recorded data and the state data.

FIG. 5 illustrates an example of transition probability data to be stored in the transition probability storage 15. In the example shown in FIG. 5, every day from the day (the first day) on which a campaign on a website started to the third day, the number of pre-behavior users, the number of visitors, the number of remaining users, a behavior probability, the number of transition users who were changed to a transition destination category group, and a transition probability indicating a probability of users being changed to a transition destination category group are recorded for each category group. The number of pre-behavior users represents the number of users who belonged to a category group at the beginning of the day. The number of visitors represents the number of users who started a session in a category on that day. The number of remaining users may be calculated by subtracting the number of visitors from the number of pre-behavior users. The behavior probability may be calculated by dividing the number of visitors by the number of pre-behavior users. The number of transition users represents the number of users who were changed to a transition destination category group. The transition probability may be calculated by dividing the number of transition users who were changed to a transition destination category group by the number of visitors.

The intended behavior probability calculator 8 calculates, every predetermined period (every time unit), the proportion of users who made a contract, which is the aim of the campaign on the website, for each category group on the basis of the state data stored in the category storage 16, and records the obtained results in the intended behavior probability recorder 14. For example, every day, the intended behavior probability calculator 8 acquires, for each category group, the number of users who were changed to a contract group on the basis of the state data, and calculates, for each category group, an intended behavior probability, which is obtained by dividing the number of contract users by the number of visitors, for each day.

In addition, as a method different from the method described above, the intended behavior probability calculator 8 receives from the intended behavior judging part 7 information indicating a user ID of a user who made a contract in a session and acquires a category group to which the user belonged before the start of the session. Thus, for every day, the number of users who performed the intended behavior can be obtained for each category group. Accordingly, the intended behavior probability can be calculated.

FIG. 6 illustrates an example of data to be recorded in the intended behavior probability recorder 14. In the example shown in FIG. 6, for every day from the day (the first day) on which a campaign on a website started to the third day, the number of pre-behavior users, the number of visitors, a behavior probability, the number of intended behavior users, and an intended behavior probability are recorded for each category group. The number of pre-behavior users, the number of visitors, and the behavior probability are the same as those contained in the transition probability data shown in FIG. 5. The number of intended behavior users represents the number of users who performed an intended behavior (contract) on that day in a category group. The intended behavior probability may be calculated by dividing the number of intended behavior users by the number of visitors. A method for calculating an intended behavior probability is not necessarily limited to the method described above. For example, an intended behavior probability may be calculated by dividing the number of intended behavior users by the number of pre-behavior users.

In the example shown in FIG. 6, since the number of pre-behavior users who belonged to the non-access group is not available, the number of pre-behavior users who belonged to the non-access group is stored as "unknown". In the case of the transition rules used in this embodiment, an intended behavior probability corresponds to a probability of changing to the contract group. However, in a case where a different definition is provided for the category transition rules, the intended behavior probability does not necessarily correspond to the probability of changing to the contract group.

As described above, the category presuming part 5 presumes a transition in the state of a user between before and after each session, and the presumption result is reflected in state data. On the basis of the state data, the transition probability calculator 6 and the intended behavior probability calculator 8 calculate, for every predetermined period, transition probabilities of transitions between individual category groups and intended behavior probabilities for individual category groups, and records the obtained transition probabilities and the obtained intended behavior probabilities in the transition probability storage 15 and the intended behavior probability recorder 14, respectively.

With this configuration, repetition of sessions by a user can be continuously observed. Thus, data indicating changes in states, which can be changed between before and after a session, such as the degree of interest, can be stored.

For example, a user who lost his/her interest in a product after referring to information on a web page should glance at a related web page in the next session. On the other hand, a user who continues to be interested in a product should carefully read a related web page in the next session. Thus, in a case where behaviors of users are followed over a plurality of sessions, for example, a probability that users who carefully browsed information on a website in the first session will continue to carefully read a related web page in the next session is 80 percent and users who carefully browsed information on a website in the first session will glance at a related web page is 20 percent, is recorded in the transition probability storage 15.

Once such a probability may be calculated, an operator of the website is able to presume the probability of a certain user having a high degree of interest, for example, by observing a behavior pattern of the user in the first session.

Furthermore, since the intended behavior probability is recorded for each category group, the operator of the website is able to understand, for each category group, what proportion of users perform an intended behavior on the website. That is, the operator of the website is able to understand the relationship between a transition to a category group to which a user belongs, the category group being presumed by the category presuming part 5, and the intended behavior and to take appropriate measures for urging the user to perform the intended behavior.

The functional parts of the user state presumption system 1 shown in FIG. 1 has been described. The user state presumption system 1 is implemented in a computer, such as a server machine, a personal computer, or a work station. The functional parts constituting the user state presumption system 1 may be implemented in a single computer or may be distributed to a plurality of computers. In addition, functions of the log receiver 2, the log abstracting part 3, the behavior categorizing part 4, the category presuming part 5, the transition probability calculator 6, the intended behavior judging part 7, and the intended behavior probability calculator 8 can be implemented when a central processing unit (CPU) of the computer performs a predetermined program. Thus, a program implementing the functions and a recording medium on which such a program is recorded may be included in an embodiment of the present invention. In addition, the transition model recorder 11, the access history data recorder 12, the intended URL recorder 13, the intended behavior probability recorder 14, the transition probability storage 15, and the category storage 16 may be embodied by a memory provided in the computer and/or a recording medium, such as a hard disk.

Figure 7:
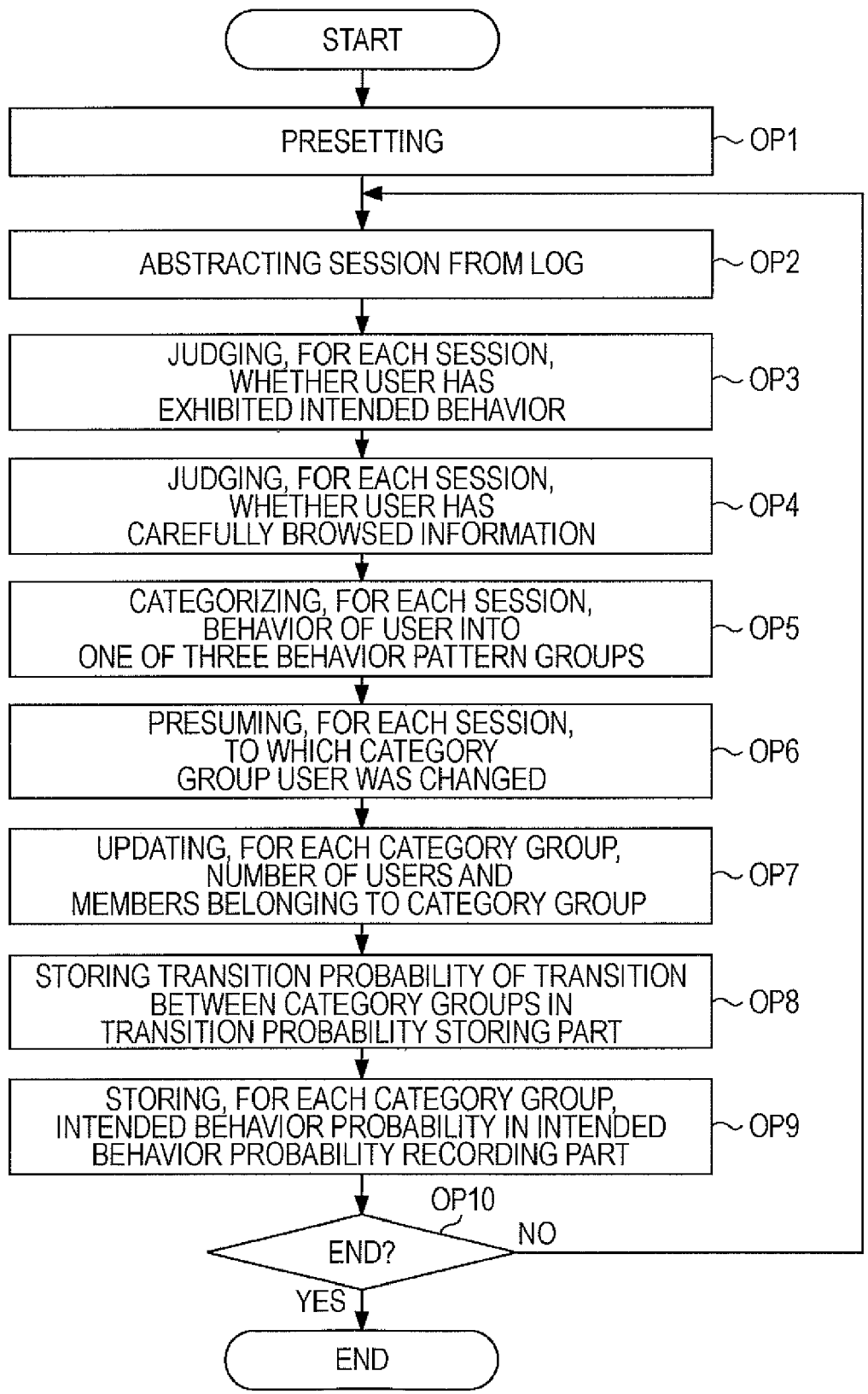
FIG. 7 illustrates an example of an operation process to be performed by the user state presumption system.

An example of the operation of the user state presumption system 1 will now be described. FIG. 7 is an operation flowchart showing an example of an operation process to be performed by the user state presumption system 1. In the operation flowchart shown in FIG. 7, an example of an operation process to be performed by the user state presumption system 1 when an operator of a website analyzes a campaign on the website will be described by way of example.

Transition condition data to be recorded in the transition model recorder 11, an intended URL to be recorded in the intended URL recorder 13, and users who belong to individual category groups to be represented by state data are preset by the operator of the website (Operation OP1). A case where the transition condition data shown in FIGS. 2A and 2B is recorded in advance will be described. For example, the URL of a web page to be accessed by a user in order to make a contract, which is the aim of the campaign on the website, is recorded as the intended URL. Before analysis of the campaign on the website may be performed, users determined to be in individual category groups or users presumed to be in individual category groups are recorded as state data. In this example, a case where a new campaign is conducted for the first time is assumed and only the presumed number of non-access users in the state data shown in FIG. 4 is set.

After presetting may be performed and the campaign on the website is started, the log receiver 2 starts reading of an access log on the website. Reading of an access log may be performed every unit time, such as every day or every hour. In this example, the log receiver 2 reads an access log every day. The log abstracting part 3 abstracts a session from the access log read by the log receiver 2 (Operation OP2). The log abstracting part 3 provides abstracted sessions with individual session numbers. The log abstracting part 3 generates access history data as shown in FIG. 3, and the generated access history data is recorded in the access history data recorder 12. Here, an intended behavior flag of the access history data is set to "0". The subsequent processing in Operations OP3 to OP7 may be performed for each of the sessions abstracted by the log abstracting part 3.

The intended behavior judging part 7 judges, for each session, whether a user has exhibited the intended behavior (Operation OP3). More specifically, the intended behavior judging part 7 checks whether the intended URL recorded in advance in Operation OP1 exists in reference URLs to which the user referred, the reference URLs being represented by access history data for the session. If it is determined that the intended URL exists in the reference URLs, the intended behavior flag of the access history data is updated from "0" to "1". In this case, the intended behavior judging part 7 identifies a category group to which a user corresponding to a user ID for which the intended behavior flag in the access history data is changed to "1" on the basis of the state data. Then, the intended behavior judging part 7 updates data recorded in the intended behavior probability recorder 14 so that the number of intended behavior users for the category group is incremented by 1.

The behavior categorizing part 4 determines whether the user carefully browsed or glanced at the website for the campaign in the session (Operation OP4). For example, the behavior categorizing part 4 is capable of analyzing access history data for all the sessions abstracted by the log abstracting part 3 on the basis of the item response theory and determining whether information pages were carefully browsed in the individual sessions.

Hereinafter, a method in which the behavior categorizing part 4 determines a behavior pattern of a user in each session on the basis of the item response theory will be described. For example, the number of web pages users can refer to on the website for the campaign is "m". The behavior categorizing part 4 defines m web pages that can be referred to by users as individual items in terms of the item response theory. Hereinafter, the ith item of the m items, that is, the ith web page, is represented as "Wi" (i=1, 2, . . . , and m). The probability Pi that the web page represented as the item Wi will be referred to is represented by a function of a characteristic value θ, which is indicated by Formula (0001), in a two-parameter logistic model. Although a case where the behavior categorizing part 4 adopts the two-parameter logistic model will be described, for example, the behavior categorizing part 4 may adopt a different IRT model, such as a three-parameter logistic model. An example formula (0001) indicates:

$$P_i(\theta) = \frac{1}{1 + e^{-1.7a_i(\theta - b_i)}}$$

In formula (0001), the characteristic value "θ" represents a value indicating the degree of interest of a user in a session. In addition, "ai" represents the item discrimination for the item Wi, and "bi" represents the item difficulty for the item Wi. In the two-parameter logistic model, "ai" and "bi" serve as item parameters.

The behavior categorizing part 4 calculates presumed values of the item parameters "ai" and "bi", for example, on the basis of Bayesian estimation or marginal maximum likelihood estimation. Here, the behavior categorizing part 4 generates a response pattern vector, as described below, on the basis of reference URLs referred to in each session represented by access history data, and calculates the presumed values of the item parameters "ai" and "bi" on the basis of the generated response pattern vector.

The behavior categorizing part 4 calculates the characteristic value θ of the user in the session on the basis of the presumed values of item parameters ai and bi and categorizes the behavior pattern of the user in the session into one of "careful browsing" and "glance".

Figure 8:
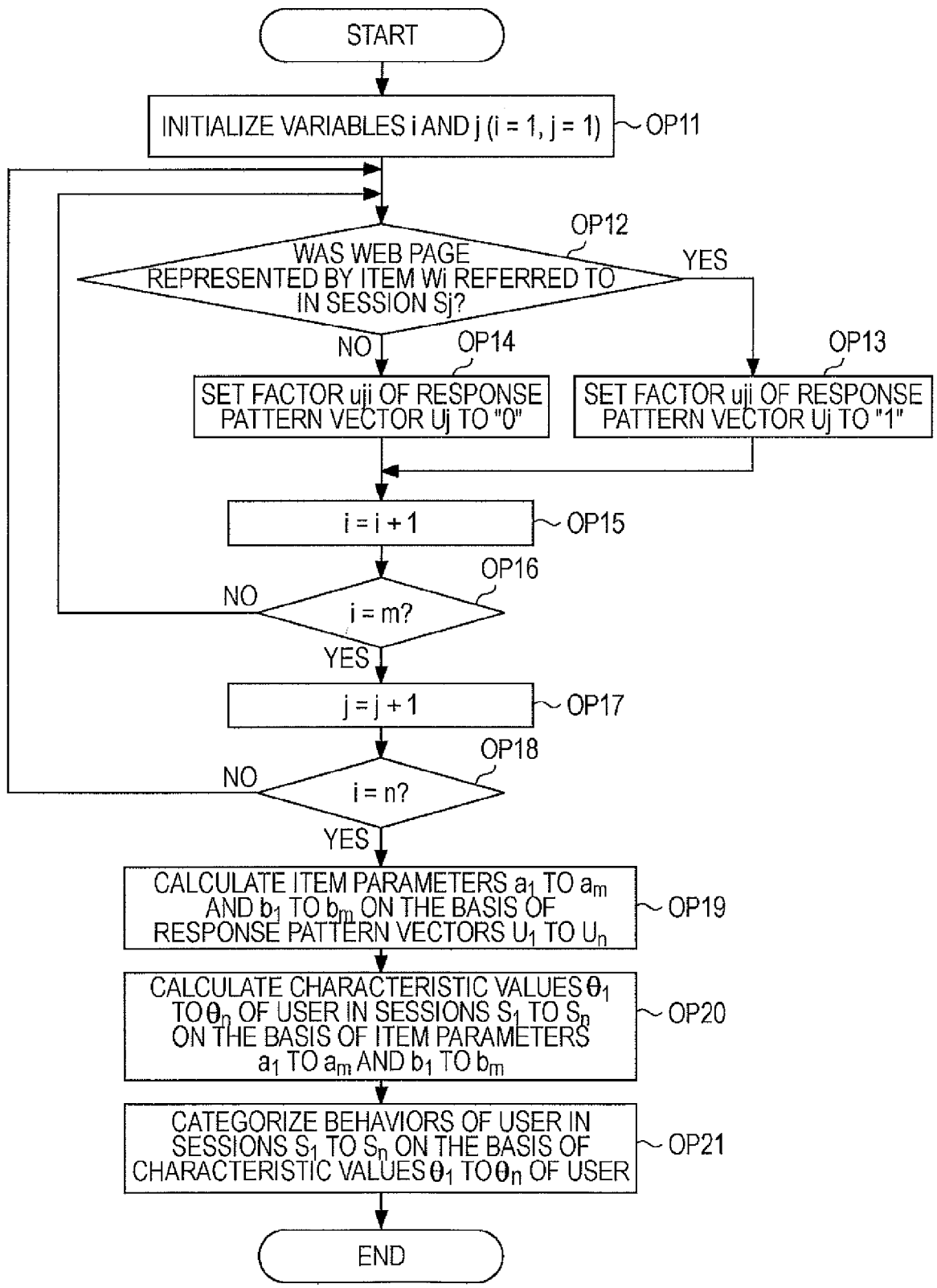
FIG. 8 illustrates an example of an operation process to be performed by a behavior categorizing part.

A specific example of an operation process to be performed by the behavior categorizing part 4 will now be described with reference to FIG. 8. In the example shown in FIG. 8, the behavior categorizing part 4 generates a response pattern vector on the basis of access history data. In FIG. 8, processing for generating a response pattern vector may be performed in Operations OP11 to OP18.

The number of sessions represented by access history data is set to "n". The jth session of the n sessions is represented by "Sj" (j=1, 2, 3, . . . , and n). The behavior categorizing part 4 generates a response pattern vector Uj=(uj1, uj2, . . . , and ujm) of the user for the m items W1 to Wm (m web pages) in the session Sj, as described below.

The behavior categorizing part 4 initializes variables j and i to 1 (Operation OP11). The behavior categorizing part 4 judges whether the URL of the web page represented by the item Wi has been referred to by the user in the session Sj (Operation OP12), and determines a factor uji of the response pattern vector Uj. For example, if the URL of the web page represented by the item Wi corresponds to any one of reference URLs contained in access history data for the session Sj, the determination in Operation OP12 is YES, and the factor uji of the response pattern vector Uj is set to "1" (Operation OP13). On the other hand, if the URL of the web page represented by the item Wi does not correspond to any one of the reference URLs contained in the access history data for the session Sj, the determination in Operation OP12 is NO, and the factor uji is set to "0".

The behavior categorizing part 4 increments the variable i by one (Operation OP15). The above-described processing is repeatedly performed until it is determined that the variable i is equal to the number m of web pages (YES in Operation OP16). Accordingly, response values, that is, factors uj1, uj2, . . . , and ujm of the response pattern vector Uj, are calculated for the items W1 to Wm. In addition, the behavior categorizing part 4 calculates response pattern vectors U1 to Un for all the sessions S1 to Sn by repeatedly performing the processing of Operations OP12 to OP16 for all the sessions (from j=1 to j=n) (Operations OP17 and OP18).

The method for calculating a response pattern vector is not necessarily limited to the above-described example. For example, in Operation OP12 in which values of factors are determined, the behavior categorizing part 4 may set to "1" the factor of an item representing a web page that has been referred to a predetermined number of times or more (or for a predetermined period of time or more) in a session Sj and may set to "0" the factor of an item representing a web page that has been referred to less than the predetermined number of times (or for less than the predetermined period of time) in the session Sj. In addition, each factor is not necessarily binary data, such as "1" or "0".

The behavior categorizing part 4 calculates presumed values of item parameters a1 to am and b1 to bm in the three-parameter logistic model equation (formula 1) on the basis of the obtained response pattern vectors U1 to Un (Operation OP19). The behavior categorizing part 4 calculates the characteristic values θ1 to θn of the user in the sessions S1 to Sn on the basis of the obtained presumed values (Operation OP20). Accordingly, the characteristic value θj representing the degree of interest of the user in the session Sj can be obtained. In the case of calculating item parameters and characteristic values in the Operations OP19 and OP20, the behavior categorizing part 4 is capable of adopting a calculation method using well-known Bayesian estimation or marginal maximum likelihood estimation.

The behavior categorizing part 4 judges whether the user performed careful browsing or took a glance in the sessions S1 to Sn on the basis of the characteristic values θ1 to θn (Operation OP21). For example, in the case that the characteristic value θj is greater than a set threshold, the behavior categorizing part 4 judges that the behavior of the user in the session Sj is categorized into "careful browsing". In the other cases, the behavior categorizing part 4 judges that the behavior of the user in the session Sj is categorized into "glance". In addition, the threshold to be used as a criterion may be a value, such as the intermediate value, the average value, or the mode value of the characteristic values θ1 to θn of a user in the sessions S1 to Sn, obtained from the characteristic values θ1 to θn.

As described above, with the use of the item response theory, weighting in view of the degree of importance is applied to each web page, and a behavior of a user in each session can be categorized on the basis of web pages referred to by the user. For example, a website for a campaign includes web pages to be read by many users and web pages to be read only by users who have a high degree of interest. With the item response theory, weighting in view of the degree of importance of a web page can be achieved.

The item response theory is an existing technique for evaluation of test examinees and the like. In addition, a case where the item response theory may be applied to analysis of access to a website. For example, conventionally, a method has been presumed, using the item response theory, whether a visitor to a website operated by a university is a prospective student. The user state presumption system 1 according to an embodiment is capable of further presuming a transition in the state of a user in sessions on the basis of results obtained by analyzing the sessions using the item response theory.

A specific example in which the processing of Operation OP4 shown in FIG. 7 may be performed has been described. If it is determined that the user performed "careful browsing" of information on the web page, the behavior categorizing part 4 updates to "1" categorization of the behavior of the user in the session represented by the access history data. If it is determined that the user performed "glance" of information on the web page, the behavior categorizing part 4 updates to "0" categorization of the behavior of the user in the session represented by the access history data.

Then, the behavior categorizing part 4 categorizes, on the basis of the result obtained by the judgment regarding the intended behavior in Operation OP3 and the result obtained by the judgment regarding categorization in Operation OP4, the behavior pattern of the user in the session into one of pattern groups 1 to 3, which constitute the behavior pattern set A (Operation OP5). The behavior categorizing part 4 is capable of categorizing behavior patterns in sessions on the basis of behavior categorization and intended behavior flags recorded in access history data.

For example, if the intended behavior flag in the access history data for the session Sj indicates "1", the behavior categorizing part 4 judges that the behavior pattern of the user in the session Sj corresponds to pattern 3 (contract). If the intended behavior flag indicates "0" and the behavior of the user is categorized into "1" (careful browsing), the behavior categorizing part 4 judges that the behavior pattern of the user corresponds to pattern 1. If the intended behavior flag indicates "0" and the behavior of the user is categorized into "0" (glance), the behavior categorizing part 4 judges that the behavior pattern of the user corresponds to pattern 2.

Then, in Operation OP6, the category presuming part 5 compares the categorization result (pattern 1, 2, or 3) obtained by the behavior categorizing part 4 with transition condition data recorded in the transition model recorder 11, and presumes to which category group the user was changed in the session. Then, the numbers of users who belong to individual category groups and user IDs of the users who belong to the individual category groups stored in the category storage 16 are updated.

For example, in the case of presuming a transition destination category group in a session Sj on the second day of a campaign, the category presuming part 5 acquires a user ID (for example, "UID2344") from access history data for the session Sj. The category presuming part 5 searches the state data shown in FIG. 4 for the user ID "UID2344", and acquires information indicating the category group "less-interested group" to which the user having the user ID "UID2344" belongs. For example, in the case that a categorization result regarding the behavior of the user in the session Sj obtained in Operation OP5 corresponds to pattern 1 (careful browsing & no contract), the category presuming part 5 acquires, on the basis of the transition condition data shown in FIG. 2B, information indicating a post-behavior category group "pending group", which matches a pre-behavior category group "less-interested group" and an in-session behavior pattern "pattern 1". The post-behavior category group "pending group" represents a transition destination category group to which the user is changed in the session Sj.

After the transition destination category group of the user in the session is determined as described above, the category presuming part 5 updates, for each category group, the number of users who belong to the category group and user IDs of the users in the category group in the state data and the transition probability data (Operation OP7). For example, in the case that it is presumed that the state of the user having the user ID "UID2344" is changed from the "less-interested group" into the "pending group" in the session Sj as in the above-described example, the category presuming part 5 adds data indicating the user ID "UID2344" to the category group "pending group" in the state data, and deletes data indicating the user ID "UID2344" from the "less-interested group" in the state data. Then, the category presuming part 5 performs updating in such a manner that the number of users in the "less-interested group" in the state data is decreased by one and the number of users in the "pending group" in the state data is increased by one.

The category presuming part 5 may perform updating in such a manner that the number of visitors in the "less-interested group" in the transition probability data shown in FIG. 5 is increased by one and the number of users who are changed from the "less-interested group" into the "pending group" is increased by one. Such updating may be performed for all the sessions S1 to Sn. Accordingly, all the presumed transitions between category groups in the sessions S1 to Sn on the second day are reflected in the transition probability data shown in FIG. 5.

Accordingly, the current number of users who belong to the "non-access group", the current number of users who belong to the "less-interested group", the current number of users who belong to the "pending group", the current number of users who belong to the "hesitant group", and the current number of users who belong to the "contract group" are presumed, and the presumed numbers are reflected in the state data and the transition probability data. Thus, the operator of the website is able to carry out measures in accordance with the numbers of users belonging to individual category groups with reference to the state data. For example, if the number of users who belong to the hesitant group is large, the operator of the website is able to judge that measures for increasing the discount rate in order to increase the attractiveness of the campaign should be carried out.

After the transition in the state of the user in each of the sessions S1 to Sn is reflected in the state data and the transition probability data in Operation OP7, the transition probability calculator 6 calculates, for each category group, the behavior probability, which is obtained by dividing the number of visitors by the number of pre-behavior users, and the transition probability of transition to a different category group, which is obtained by dividing the number of users who are changed to the different category group by the number of visitors, and records the obtained behavior probability and the obtained transition probability (Operation OP8).

In the case of the "less-interested group" on the second day in the transition probability data shown in FIG. 5, the transition probability calculator 6 calculates the behavior probability by dividing the number of visitors by the number of pre-behavior users (that is, 602/1505=0.4), and the obtained behavior probability is recorded. The transition probability of transition to the "less-interested group" is obtained by dividing the number of users who are changed to the "less-interested group" by the number of visitors (that is, 390/602=0.647841). Similarly, the transition probability of transition to the "pending group" is obtained by dividing the number of users who are changed to the "pending group" by the number of visitors (that is, 110/602=0.182724), and the transition probability of transition to the "contract group" is obtained by dividing the number of users who are changed to the "contract group" by the number of visitors (that is, 102/602=0.169435).

The intended behavior probability calculator 8 calculates, for each category group, the proportion of users who have exhibited the intended behavior within a unit time, and the obtained proportion is recorded in the intended behavior probability recorder 14 (Operation OP9). FIG. 6 illustrates an example of data to be recorded in the intended behavior probability recorder 14. In the case of the "less-interested group" on the "second day" in the data shown in FIG. 6, the intended behavior probability calculator 8 calculates the intended behavior probability by dividing the number of intended behavior users by the number of visitors (that is, 102/602=0.169435216).

The processing of Operations OP2 to OP9 is repeated, for example, every time the log receiving unit 2 reads an access log. In an embodiment, since an access log is read every day, the processing of Operations OP2 to OP9 may be performed once a day. Thus, as shown in FIGS. 5 and 6, transition probabilities and intended behavior probabilities are calculated once a day, and the obtained transition probabilities and intended behavior probabilities are recorded. A cycle in which the log receiving unit 2 reads an access log is not necessarily the same as a cycle in which the transition probability calculator 6 and the intended behavior probability calculator 8 calculate transition probabilities and intended behavior probabilities.

For example, in the case that the operator of the website issues an instruction to end the process, for example, at the ending of a campaign period (YES in Operation OP10), the user state presumption system 1 ends its operation. Although an example of the operation of the user state presumption system 1 has been described above, the operation of a user state presumption system according to the present invention is not necessarily limited to the above-described example shown in FIG. 7.

In the process shown in FIG. 7, every day during the campaign period, the proportion of users who have made a contract, which is the aim of the campaign, is recorded, for each category group, in the intended behavior probability recorder 14. In addition, every day during the campaign period, data indicating the proportion of users who visited the website and performed a session and data indicating to which category groups the users were changed are stored, for each category group, in the transition probability storage 15. Thus, such data is effective for the operator of the website to know a transition in the state of a user before exhibiting the intended behavior in the campaign or a transition in the state of a user who does not exhibit the intended behavior. In addition, with the use of such data, for example, a simulation of how access occurs and a simulation of how many users make a contract in a future time lapse can be carried out and prediction can be achieved, as described below.

Figure 9:
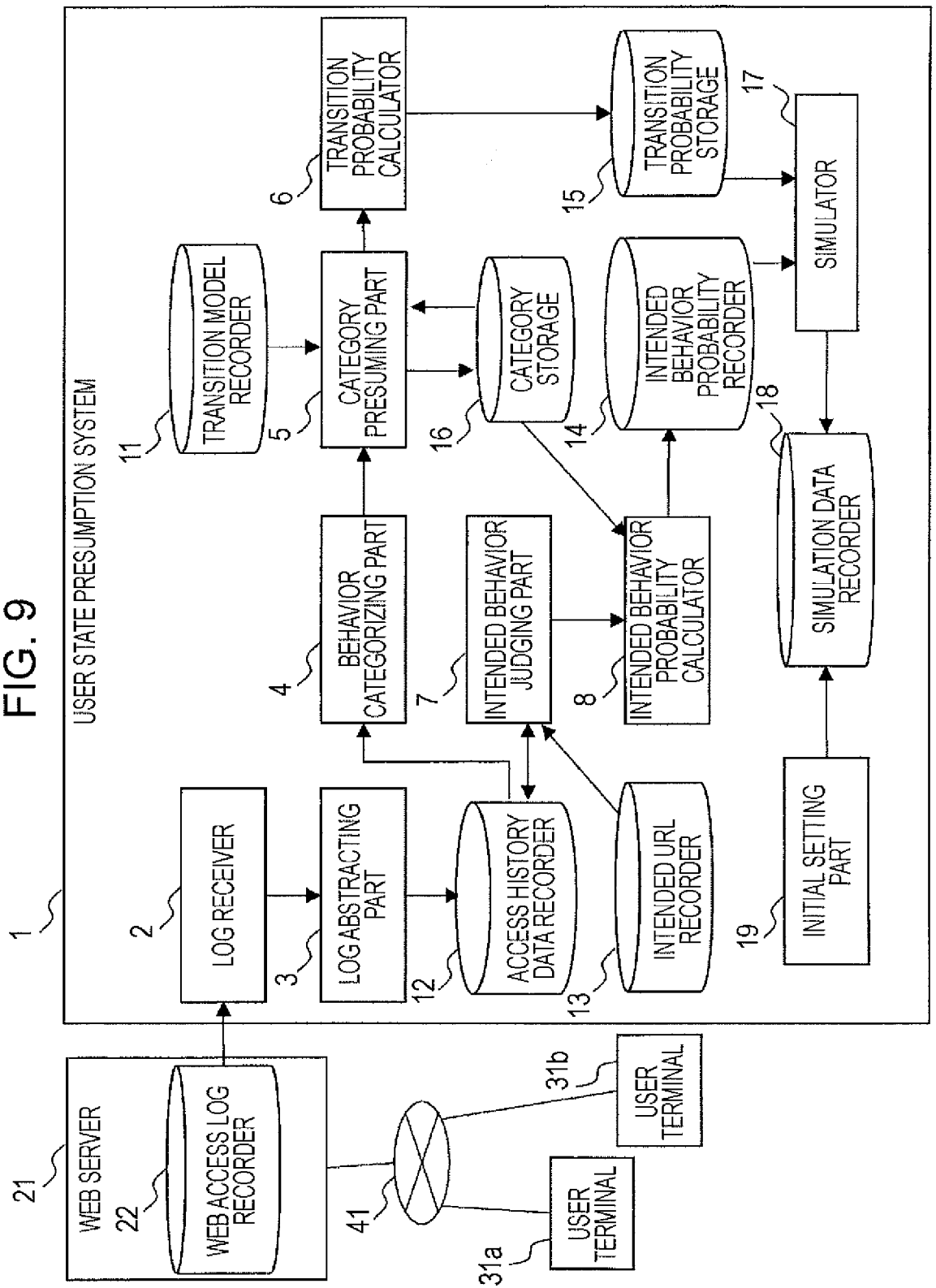
FIG. 9 illustrates an example of the configuration of a user state presumption system according to an exemplary embodiment.

FIG. 9 illustrates an example of the configuration of a user state presumption system 10 according to an exemplary embodiment. Referring to FIG. 9, the same functional parts as in FIG. 1 are represented by the same reference numerals. The user state presumption system 10 shown in FIG. 9 has a configuration in which a simulator 17, a simulation data recorder 18, and an initial setting part 19 are added to the user state presumption system 1 shown in FIG. 1.

That is, the user state presumption system 10 shown in FIG. 9 further has, for example, a feature of predicting a future access status, a future intended behavior probability, and the like of a user on the basis of data recorded in the intended behavior probability recorder 14 and the transition probability storage 15.

For example, data indicating an initial condition regarding a simulation, data to be used for a simulation, data indicating a simulation result, and the like are recorded in the simulation data recorder 18. In an embodiment, transition simulation data regarding a simulation of the number of users in each category group who are changed to a different category group and intended behavior simulation data regarding a simulation of the number of intended behavior users in each category group are recorded in the simulation data recorder 18.

FIG. 10 illustrates an example of transition simulation data to be recorded in the simulation data recorder 18. In the example shown in FIG. 10, every day during a period in which simulations are to be performed (in this example, the first to third days), the number of pre-behavior users, the behavior probability, the number of visitors, the number of remaining users, and the transition probability and the number of transition users for each transition destination category group, are recorded for each category group. The number of pre-behavior users in each category group on the first day is set in advance as an initial condition. In addition, behavior probabilities and transition probabilities on each day are set in advance on the basis of data stored in the transition probability storage 15 and used in simulations. The number of visitors and the number of transition users on each day for each category group are calculated as simulation results and recorded.

FIG. 11 illustrates an example of intended behavior simulation data to be recorded in the simulation data recorder 18. In the example shown in FIG. 11, every day during a period in which simulations are to be performed (in this example, the first to third days), the number of pre-behavior users, the behavior probability, the number of visitors, the intended behavior probability, and the number of intended behavior users are recorded for each category group. The number of pre-behavior users in each category group on the first day is set in advance as an initial condition. In addition, behavior probabilities and intended behavior probabilities on each day are set in advance on the basis of data stored in the intended behavior probability recorder 14 and used in simulations. The number of visitors and the number of intended behavior users on each day for each category group are calculated as simulation results.

For example, the initial setting part 19 receives an input from an operator of a website or the like, and records an initial condition for a simulation based on the input in the simulation data recorder 18. For example, the number of users in each category group at the start of a simulation is set as an initial condition.

The simulator 17 performs simulations of how many accesses will be made within a unit time in each category group, how the number of users in the category group will be changed, and how many users will exhibit an intended behavior (make a contract) within a unit time. The simulator 17 refers to the simulation data recorder 18 to acquire the number of users in each category group, transition probabilities of transitions between individual category groups within a unit time, the transition probabilities being recorded on the basis of data stored in the transition probability storage 15, and intended behavior probabilities for individual category groups within a unit time, the intended behavior probability being recorded on the basis of data recorded in the intended behavior probability recorder 14, and performs simulations on the basis of the obtained transition probabilities and intended behavior probabilities. In addition, simulation results are also recorded in the simulation data recorder 18.

Figure 12:
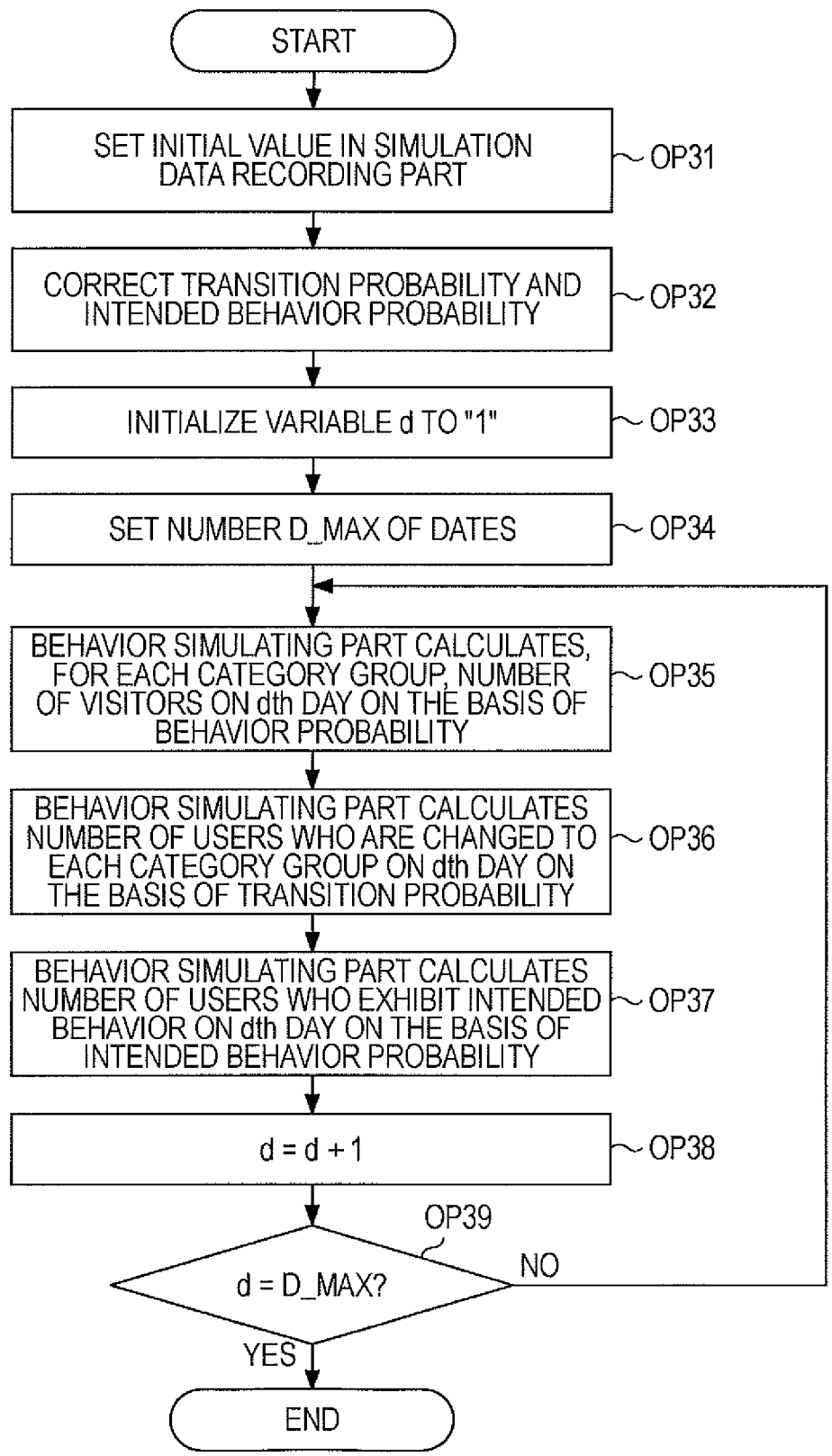
FIG. 12 illustrates an example of a simulation operation process to be performed in an exemplary embodiment.

An example of the operation of the user state presumption system 10 according to an embodiment will now be described. FIG. 12 is an operation flowchart showing an example of an operation process to be performed by the user state presumption system 10. In FIG. 12, an operation process to perform a simulation on the basis of the transition probabilities shown in FIG. 5 and the intended behavior probabilities shown in FIG. 6 calculated in the first embodiment will be described by way of example. That is, a case where a simulation may be performed on the basis of the transition probabilities and the intended behavior probabilities recorded on the basis of access logs for the campaign on the website in the first embodiment will be described.

The initial setting part 19 sets, as an initial condition for a simulation, the number of users in each category group at the start of the simulation (Operation OP31). In the examples shown in FIGS. 10 and 11, as the numbers of pre-behavior users on the first day, 3000 users and 100 users are set for the non-access group and the pending group, respectively. The setting values are, for example, determined and entered by the operator of the website for which a simulation is to be performed.

As described above, in the case of predicting the number of future visitors for the next campaign after the first campaign ends, the numbers of visitors determined to be in individual category groups or the numbers of visitors presumed to be in individual category groups can be recorded in advance as initial conditions in transition simulation data. In a case where a new campaign is carried out for the first time, since all users are categorized into a non-access group, the operator of the website defines, for example, only the number of users presumed to be in the non-access group. A case where, after the last campaign ends, the operator of the website presumes that 100 users remain in the pending group and 3000 users are presumed to be in the non-access group is shown in the example of FIG. 10.

In the campaign, if a behavior probability, a transition probability, or an intended behavior probability in the data recorded in the intended behavior probability recorder 14 and the transition probability storage 15 includes an unknown value, the initial setting part 19 performs correction so that an appropriate value is set for the unknown value (Operation OP32).

In the example shown in FIG. 5, the number of pre-behavior users in the non-access group is unknown. Thus, the initial setting part 19 uses the total number of visitors in the non-access group for three days from the first to third days (that is, 2015+1020+510=3545) as the number of pre-behavior users in the non-access group. The initial setting part 19 calculates the behavior probability for each day by dividing the number of visitors by the number of pre-behavior users, and the obtained behavior probabilities are recorded in the transition simulation data shown in FIG. 10. For example, the behavior probability on the first day (that is, 2015/3545=0.5684) is obtained. Similarly, the initial setting part 19 calculates both behavior probabilities and intended behavior probabilities on the first day on the basis of the data recorded in the intended behavior probability recorder 14 shown in FIG. 6, and the obtained behavior probabilities and the obtained intended behavior probabilities are recorded in the intended behavior simulation data shown in FIG. 11.

Since the behavior probability of users in the pending group on the first day does not exist in the transition probability data shown in FIG. 6, for example, the initial setting part 19 can use the average of the behavior probabilities on the second and third days in the transition probability data as a presumed behavior probability on the first day and the obtained behavior probability can be recorded in the transition simulation data.

In addition, the initial setting part 19 sets determined behavior probabilities and transition probabilities in the transition probability data shown in FIG. 6 (that is, behavior probabilities and transition probabilities on the second and third days for each category group) as behavior probabilities and transition probabilities on the second and third days for each category group in the transition simulation data shown in FIG. 10. In addition, the initial setting part 19 sets determined behavior probabilities and transition probabilities in the data shown in FIG. 5 as behavior probabilities and intended behavior probabilities on the second and third days for each category group in the intended behavior simulation data.

Regarding the transition probability data shown in FIG. 5, the behavior probabilities for the less-interested group, the pending group, and the hesitant group on the first day and the behavior probability for the hesitant group on the second day are unknown. In this case, the initial setting part 19 uses, as a behavior probability, the average of values on days on which actual values were obtained. In the case of the less-interested group, since data on the second and third days are available, the average value of the data on the second day and the data on the third day (that is, ((602/1505)+(812/2067))/2≈0.396) is used as the behavior probability for the less-interested group for a simulation. In the case of the pending group, since data on the second and third days are available, the average value of the data on the second day and the data on the third day (that is, ((398/411)+(402/419))/2≈0.9638) is used as the behavior probability for the pending group for a simulation. In the case of the hesitant group, since only data on the behavior probability on the third day is available, the data on the third day "0.3" is directly used as the behavior probability on each of the first to third days for a simulation.

In addition, the initial setting part 19 obtains the average of determined transition probabilities in the transition probability data shown in FIG. 5, and sets the obtained average as a transition probability in the transition simulation data shown in FIG. 10. For example, transition probabilities of transition from the non-access group to the less-interested group are approximately the same over the three days in the example shown in FIG. 5. The average of the transition probabilities (that is, ((1505/2015)+(774/1020)+(365/510))/3=0.74) is obtained and the obtained average is used as the transition probability from the non-access group to the less-interested group for a simulation. Similarly, for other transition patterns, the initial setting part 19 calculates the average of transition probabilities shown in FIG. 5, and the obtained average is used as a transition probability for a simulation shown in FIG. 10.

In addition, the initial setting part 19 is capable of calculating both behavior probabilities and intended behavior probabilities for the intended behavior simulation shown in FIG. 11 on the basis of both the intended behavior probabilities and the behavior probabilities for individual category groups shown in FIG. 6. After the processing of Operations OP31 and OP32 is terminated, the simulator 17 initializes a variable d to "1" (Operation OP33). Then, the number D_MAX of dates (here, for example, D_MAX=3) for which a simulation is to be performed is set (Operation OP34).

The simulator 17 calculates the number of visitors in each category group on the dth day on the basis of the number of users in the category group and the behavior probability in the category group on the dth day in the transition simulation data recorded in the simulation data recorder 18 (Operation OP35). For example, in the case that d is 1, the number of visitors in the non-access group on the first day may be calculated (that is, 3000×0.568406=1705.219), as in the example shown in FIG. 10.

Then, the simulator 17 calculates, for each category group, the number of transition users who are changed to a different category group on the basis of the number of visitors and the transition probability of transition to the different category group (Operation OP36). For example, in the example shown in FIG. 10, in the case that d is 1, for the non-access group on the first day, the simulator 17 calculates the number of transition users who are changed to the less-interested group (that is, 1705.219×0.740469=1262.662). In addition, the simulator 17 calculates the number of transition users who are changed to the pending group (that is, 1705.219×0.213742=364.4763), and calculates the number of users who are changed to the contract group (that is, 1705.219×0.045789=78.08015).

In addition, the simulator 17 calculates, for each category group, the number of intended behavior users on the basis of the number of visitors in the category group and the intended behavior probability for the category group (Operation OP37). For example, in the case that d is 1, in the example shown in FIG. 11, the simulator 17 calculates the number of intended behavior users in the non-access group on the first day (that is, 1705.219×0.045789=78.08015), calculates the number of intended behavior users in the less-interested group (that is, 0×0.175235=0), calculates the number of intended behavior users in the pending group (that is, 96.38985×0.470137=45.31641), and calculates the number of intended behavior users in the hesitant group (that is, 0×0=0).

The processing of Operations OP35 to OP37 may be performed while the variable d is incremented by one (Operation OP38) until the equation d=D_MAX is satisfied (YES in Operation OP39). In an embodiment, since the number D_MAX is set to 3, the processing of Operations OP35 to OP37 is repeated until the variable d reaches 3. Accordingly, the number of visitors, the number of transition users who are changed to a different category group, and the number of intended behavior users are calculated for each category group on each day from the first to third days.

As described above, with the execution of the process shown in FIG. 12, in a case where a new campaign is carried out, simulation and calculation of the number of users who are changed to a different category group. The number of intended behavior users who exhibit the intended behavior can be performed for each category group on the basis of both transition probabilities and intended behavior probabilities abstracted from the previous campaign. For example, even in a case where the same campaign as the previous campaign is carried out, if the numbers of users in individual category groups at the start of the present campaign and the previous campaign are different, changes in the numbers of users in the individual category groups may be different between the present and previous campaigns. Since information on the presumption of how the number of users in each category group in the present campaign is changed from the number of users in the category group in the previous campaign is input as initial conditions in advance in this embodiment, realistic simulation results can be acquired, in accordance with the process shown in FIG. 12, taking into consideration the number of users in each category group after the previous campaign may be performed. In addition, since a simulation may be performed on the basis of the numbers of users in individual category groups and behavior probabilities and transition probabilities within a unit time in this embodiment, a simulation of the tendency of users can be achieved without tracking individual users on the basis of their user IDs or the like.

According to an embodiment, simulation results, instead of the number of transition users who are changed to a different category group and the number of intended behavior users who exhibit an intended behavior for each category group, the amounts of change in the number of transition users who are changed to a different category group and the number of intended behavior users who exhibit an intended behavior per unit time may be calculated for each category group.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HOD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A user state presumption system comprising:
a category storage which stores state data indicating to which states defined in advance a plurality of users who accessed a server providing a service via a network belong;
a transition model recorder which records, for a transition between the states defined in advance, transition condition data indicating a user behavior pattern in association with a pre-behavior category group and a post-behavior category group, serving as a condition for changing of a user from a certain state to another state;
a log receiver which reads an access log containing data identifying the plurality of users who accessed the server, data indicating information to which the plurality of users referred and reference times at which the plurality of users referred to the information;
a log abstracting part which detects, for each of the plurality of users, beginning and ending of a series of accesses made by the user based on the access log read by the log receiver and abstracts, for a series of accesses made by the user, access history data containing data identifying information referred to by the user in the series of accesses;
a behavior categorizing part which categorizes, based on the information referred to by the user in the series of accesses indicated by the access history data abstracted by the log abstracting part, a behavior of the user in the series of accesses into one of a plurality of behavior patterns defined in advance;
a category presuming part which presumes how a state of each of the plurality of users indicated by the state data stored in the category storage changes by comparing the behavior pattern of the user determined by the behavior categorizing part with the user behavior pattern in association with the pre-behavior category group and the post-behavior category group serving as the condition for the transition between the states indicated by the transition condition data recorded in the transition model recorder and updates the state data based on a result of the presumption;
a transition probability storage which stores a transition probability of a user transition between the states defined in advance;
a transition probability calculator which calculates, every predetermined period, the transition probability of the user transition between the states defined in advance by referring to the state data and stores the obtained transition probability in the transition probability storage;

an intended behavior judging part which judges, based on the access history data abstracted by the log abstracting part, whether the user has exhibited a specific intended behavior that is an aim of the service provided by the server in the series of accesses;

an intended behavior probability recorder which records the proportion of users who have exhibited the intended behavior among users in individual states; and an intended behavior probability calculator which calculates, every predetermined period, the proportion of users who have exhibited the intended behavior among the plurality of users in the individual states based on a result of the judgment obtained by the intended behavior judging part and the state data and records the obtained proportion in the intended behavior probability recorder, and wherein the condition for transition between the states identifies a rule as defined by the aim of the service provided via a website.

2. The user state presumption system according to claim 1, comprising:

a simulator which sets, as initial conditions, numbers of initial users who belong to individual states based on instructions received from an operator, and simulates, based on the transition probability for every predetermined period stored in the transition probability storage and the proportion of users who have exhibited the intended behavior in the individual states, a manner in which numbers of users in the individual states set as the initial conditions change with time and a manner in which numbers of users who exhibit the intended behavior in the individual states change with time.

3. The user state presumption system according to claim 1, wherein the log abstracting part obtains, from the access log, data serving as the access history data, the access history data contains data indicating units of information to which the plurality of users referred in respective series of accesses among units of information to which the plurality of users in the service provided by the server accessed, and the behavior categorizing part obtains, in an item response theory model where the units of information that the plurality of users can refer to are defined as items in the item response theory and probabilities that the units of information corresponding to the items will be referred to, are represented using functions of characteristic values of the plurality of users based on item parameters, presumed values of the item parameters by generating response pattern vectors indicating responses to the items based on the units of information referred to by the plurality of users in the respective series of accesses indicated by the access history data, and categorizes behavior patterns of the plurality of users based on the characteristic values obtained based on the presumed values of the item parameters.

4. The user state presumption system according to claim 1, wherein the log abstracting part abstracts both the data identifying the information referred to by the plurality of users in respective series of accesses and the data indicating the reference times at which the plurality of users referred to the information, as the access history data, from the access log, and the behavior categorizing part obtains, for each of the plurality of users, both a value indicating the degree of interest of the user in the service in the series of accesses based on the information referred to by the user in the series of accesses and the reference times at which the user referred to the information indicated by the access history data abstracted by the log abstracting part, and categorizes the behavior of the user based on the obtained value.

5. A user state presumption method that causes a computer including a category storage, a transition model recorder, a log receiver, a log abstracting part, a behavior categorizing part, a category presuming part, a transition probability calculator, a transition probability storage, an intended behavior judging part, an intended behavior probability calculation part, and an intended behavior probability recorder for executing processes, the user state presumption method comprising:

storing, in the category storage, state data indicating to which states defined in advance a plurality of users who accessed a server providing a service to a plurality of users via a network belong;

recording, in the transition model recorder, for a transition between the states defined in advance, transition condition data indicating a user behavior pattern in association with a pre-behavior category group and a post-behavior category group serving as a condition for changing of a user from a certain state to another state;

reading, with the log receiver, an access log containing data identifying the plurality of users who accessed the server, data indicating information to which the plurality of users referred and reference times at which the plurality of users referred to the information;

detecting, with the log abstracting part, for each of the plurality of users, beginning and ending of a series of accesses made by the user based on the access log and abstracting, for a series of accesses made by the user, access history data containing data identifying information referred to by the user in the series of accesses;

categorizing, with the behavior categorizing part, based on both the information referred to by the user in the series of accesses indicated by the access history data and a behavior of the user in the series of accesses into one of a plurality of behavior patterns defined in advance;

presuming, with the category presuming part, how a state of each of the plurality of users indicated by the state data stored in the category storage changes by comparing the behavior pattern of the user determined by the behavior categorizing part with the user behavior pattern in association with the pre-behavior category group and the post-behavior category group, serving as the condition for the transition between the states indicated by the transition condition data recorded in the transition model recorder and updating the state data based on a result of the presumption;

storing, in the transition probability storage, a transition probability of a user transition between the states defined in advance, the transition probability being calculated every predetermined period, with the transition probability calculator, by referring to the state data;

judging, with the intended behavior judging part, based on the access history data, whether the user has exhibited a specific intended behavior that is an aim of the service provided by the server in the series of accesses; and calculating, with the intended behavior probability calculator, every predetermined period, the proportion of users who have exhibited the intended behavior among the plurality of users in the individual states based on a result of the judgment obtained by the intended behavior judging part and the state data and recording the obtained proportion in the intended behavior probability recorder, and wherein the condition for transition between the states identifies a rule as defined by the aim of the service provided via a website.

6. A computer-readable recording medium storing a user state presumption program for causing a computer to execute the operation of:

storing state data indicating to which states defined in advance a plurality of users who accessed a server providing a service to a plurality of users via a network belong;

recording, for a transition between the states defined in advance, transition condition data indicating a user behavior pattern in association with a pre-behavior category group and a post-behavior category group, serving as a condition for changing of a user from a certain state to another state;

reading an access log containing both data identifying the plurality of users who accessed the server and data indicating information referred to by the plurality of users and reference times at which the plurality of users referred to the information;

detecting, for each of the plurality of users, beginning and ending of a series of accesses made by the user based on the access log read in the reading operation and abstracting, for a series of accesses made by the user, access history data containing data identifying information referred to by the user in the series of accesses;

categorizing, based on the information referred to by the user in the series of accesses indicated by the access history data abstracted in the abstracting operation, a behavior of the user in the series of accesses into one of a plurality of behavior patterns defined in advance;

presuming how a state of each of the plurality of users indicated by the state data stored in the storing operation changes by comparing the behavior pattern of the user determined in the categorizing operation with the user behavior pattern in association with the pre-behavior category group and the post-behavior category group, serving as the condition for the transition between the states indicated by the transition condition data recorded in the recording operation and updating the state data based on a result of the presuming operation;

calculating, every predetermined period, a transition probability of a user transition between at least two states of the states defined in advance by referring to the state data and recording the obtained transition probability;

judging, based on the access history data abstracted in the abstracting operation, whether the user has exhibited a specific intended behavior that is an aim of the service provided by the server in the series of accesses; and calculating, every predetermined period, the proportion of users who have exhibited the intended behavior among the plurality of users in the individual states based on a result of the judgment obtained in the judging operation and the state data and recording the obtained proportion, and wherein the condition for transition between the states identifies a rule as defined by the aim of the service provided via a website.

7. The user state presumption system according to claim 1, wherein an in-session behavior pattern serves as the condition under which a category group is changed from the pre-behavior category group to the post-behavior category group as a transition rule.

* * * * *

UNITED STATES PATENT AND TRADEMARK OFFICE
CERTIFICATE OF CORRECTION

PATENT NO. : 8,341,102 B2
APPLICATION NO. : 12/190150
DATED : December 25, 2012
INVENTOR(S) : Masashi Uyama et al.

Page 1 of 1

It is certified that error appears in the above-identified patent and that said Letters Patent is hereby corrected as shown below:

Title page Col. 2 (Other Publications); Line 8, Delete "Effextiveness" and insert -- Effectiveness --, therefor.

Signed and Sealed this
Twenty-sixth Day of March, 2013

Teresa Stanek Rea
*Acting Director of the United States Patent and Trademark Office*